United States Patent
Yamamoto

(10) Patent No.: US 7,612,961 B2
(45) Date of Patent: Nov. 3, 2009

(54) MAGNETIC RECORDING DISK AND DISK DRIVE WITH PATTERNED PHASE-TYPE SERVO FIELDS FOR READ/WRITE HEAD POSITIONING

(75) Inventor: Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 236 days.

(21) Appl. No.: 11/871,281

(22) Filed: Oct. 12, 2007

(65) Prior Publication Data

US 2009/0097156 A1    Apr. 16, 2009

(51) Int. Cl.
 G11B 5/09  (2006.01)
(52) U.S. Cl. ...................................... 360/48; 360/77.06
(58) Field of Classification Search ........................ None
See application file for complete search history.

(56) References Cited

U.S. PATENT DOCUMENTS

| | | | |
|---|---|---|---|
| 4,454,549 A * | 6/1984 | Pennington | 360/77.08 |
| 4,549,232 A | 10/1985 | Axmear et al. | |
| 4,598,327 A * | 7/1986 | Jen et al. | 360/77.07 |
| 4,912,585 A | 3/1990 | Belser et al. | |
| 5,296,995 A * | 3/1994 | Yonezawa et al. | 360/135 |
| 5,585,989 A * | 12/1996 | Kuromiya et al. | 360/135 |
| 5,587,223 A | 12/1996 | White | |
| 5,820,769 A | 10/1998 | Chou | |
| 5,875,083 A * | 2/1999 | Oniki et al. | 360/135 |
| 6,043,951 A * | 3/2000 | Lee | 360/77.08 |
| 6,383,598 B1 | 5/2002 | Fullerton et al. | |
| 6,490,111 B1 * | 12/2002 | Sacks | 360/53 |
| 6,490,117 B1 | 12/2002 | Sacks et al. | |
| 6,529,341 B1 * | 3/2003 | Ishida et al. | 360/48 |
| 6,754,016 B2 | 6/2004 | Messner et al. | |
| 7,019,925 B2 * | 3/2006 | Ehrlich | 360/48 |
| 2004/0252394 A1 | 12/2004 | Hamaguchi et al. | |
| 2006/0280975 A1 | 12/2006 | Albrecht et al. | |

OTHER PUBLICATIONS

Lin, et al., "Investigation of advanced position error signal patterns in patterned media", J. Appl. Phys., vol. 87, No. 9, May 1, 2000, pp. 5117-5119.
Baker, "Direct print servo patterns for disk drive", J. Appl. Phys., vol. 97, 10P105 (2005).

* cited by examiner

Primary Examiner—Jason C Olson
(74) Attorney, Agent, or Firm—Thomas R. Berthold

(57) ABSTRACT

A magnetic recording disk drive uses a disk having pre-patterned servo sectors extending generally radially across the data tracks. The servo sectors include at least two position error signal (PES) bursts or fields. The phases of the PES fields in the servo readback signal are demodulated to generate a PES to control the disk drive actuator for positioning the read/write heads. Each field contains generally radially directed magnetized stripes, with each stripe comprising a plurality of discrete radially-spaced generally parallelogram-shaped islands, each island having its length oriented at an acute angle relative to a track centerline. The stripes have alternating polarity of magnetizations in the along-the-track direction. In one implementation there are four fields: a first pair of fields A and B wherein the pattern of the radial stripes in field A is the mirror image about a radial line of the pattern of the radial stripes in field B, and a second like pair of fields C and D, but wherein the radial stripes in fields C and D are shifted radially from the radial stripes in fields A and B.

25 Claims, 15 Drawing Sheets

MAGNETIC RECORDING DISK AND DISK DRIVE WITH PATTERNED PHASE-TYPE SERVO FIELDS FOR READ/WRITE HEAD POSITIONING

RELATED APPLICATION

This application is related to pending application Ser. No. 11/837,503 filed Aug. 11, 2007 and titled "MAGNETIC RECORDING DISK AND DISK DRIVE WITH PATTERNED PHASE-TYPE SERVO FIELDS FOR READ/WRITE HEAD POSITIONING".

BACKGROUND OF THE INVENTION

1. Field of the Invention

This invention relates generally to patterned-media magnetic recording disks, wherein each data bit is stored in a magnetically isolated data island on the disk, and more particularly to a patterned-media disk and disk drive with patterned nondata servo fields for head-positioning.

2. Description of the Related Art

Magnetic recording hard disk drives with patterned magnetic recording media have been proposed to increase the data density. In patterned media, the magnetic recording layer on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. Alternatively, the patterned media may be fabricated so that that there is no magnetic material in the spaces between the islands. U.S. Pat. Nos. 5,820,769; 5,587,223; and 6,383,598 are representative of various types of patterned media and their methods of fabrication.

Like conventional non-patterned or continuous-media disks, patterned-media disks also have nondata servo regions that are used for read/write head positioning. The nondata servo regions in patterned-media disks contain servo blocks or islands separated by nonmagnetic spaces. The servo blocks form a servo pattern that generates a servo readback signal that is demodulated into a position error signal (PES) for positioning the read/write head to the desired data track and maintaining it on track. The proposed method for formatting this type of disk is to DC "erase" the disk during manufacturing with a large magnet, leaving all of the servo islands magnetized in the same direction. Thus for a patterned-media perpendicular magnetic recording disk, all of the servo islands would have a magnetization direction either "into" or "out of" the surface of the disk. However, because only a single polarity of magnetization is used with this method, half of the available signal amplitude from the servo islands is sacrificed and thus the signal-to-noise ratio (SNR) is less than optimum. Pending application Ser. No. 11/148,918, published as US2006/0280975 A1 and assigned to the same assignee as this application, describes a magnetic recording disk with discrete servo islands having alternating polarity in the along-the-track direction and patterned so as to form a conventional quadrature servo pattern.

What is needed is a patterned-media magnetic recording disk with nondata servo islands that have alternating polarity of magnetization to provide optimal SNR, but also form an improved servo pattern that is relatively easy to demodulate into a PES.

SUMMARY OF THE INVENTION

The invention relates to a magnetic recording disk drive and disk, with the disk having pre-patterned nondata servo sectors extending generally radially across the data tracks. The servo sectors include at least two position error signal (PES) bursts or fields. The phases of the PES fields in the servo readback signal are demodulated to generate a PES to control the disk drive actuator for positioning the read/write heads. Each field contains generally radially directed magnetized stripes, with each stripe comprising a plurality of discrete radially-spaced generally parallelogram-shaped islands, each island having its length oriented at an acute angle relative to a track centerline. In one implementation each island has a radial height of approximately Tp, where Tp is the track pitch or spacing of the track centerlines in the radial direction. In a first field, the islands are centered at a track centerline, and in a second field the islands are centered halfway at the midline between two adjacent track centerlines. The stripes have alternating polarity of magnetizations in the along-the-track direction.

In one implementation there are four fields: a first pair of fields A and B wherein the pattern of the radial stripes in field A is the mirror image about a radial line of the pattern of the radial stripes in field B, and a second pair of fields C and D wherein the pattern of radial stripes in field C is the mirror image about a radial line of the pattern of the radial stripes in field D, and wherein the radial stripes in fields C and D are shifted radially by one-half Tp from the radial stripes in fields A and B. In another implementation only three of the A, B, C and D fields are used. In still another implementation only one field in each A-B and C-D pair is used, together with a synchronization pattern of generally radially directed magnetized marks wherein the synchronization marks also have alternating polarity of magnetizations in the along-the-track direction.

The disk may be a patterned-media disk with both pre-patterned data islands and pre-patterned nondata servo sectors, a continuous-media disk with conventional continuous-media data tracks and pre-patterned nondata servo sectors, or a continuous-media disk with discrete data tracks and pre-patterned nondata servo sectors.

The disk drive includes servo electronics that measures the phase of the servo readback signal from the different fields. In the implementation that uses the two pairs of fields (A-B and C-D), a main PES (mPES) is calculated by the phase difference between Field-A and Field-B and a substitute PES (sPES) is calculated by the phase difference between Field-C and Field-D. In another implementation that uses only one field in each of the A-B and C-D pairs, for example only fields A and C, together with a synchronization pattern, the mPES is calculated by the phase difference between Field-A and the synchronization pattern and the sPES is calculated by the phase difference between Field-C and the synchronization pattern. For the case where the radial spacing of the centers of the islands is Tp, the mPES is proportional to the read head offset from the track centerline, and sPES is proportional to the read head offset from the midpoint of two track centerlines. For the final PES calculation, one or the other of the calculated mPES and sPES values is selected, depending on the read head radial location.

For a fuller understanding of the nature and advantages of the present invention, reference should be made to the following detailed description taken together with the accompanying figures.

DETAILED DESCRIPTION OF THE INVENTION

Figure 1:
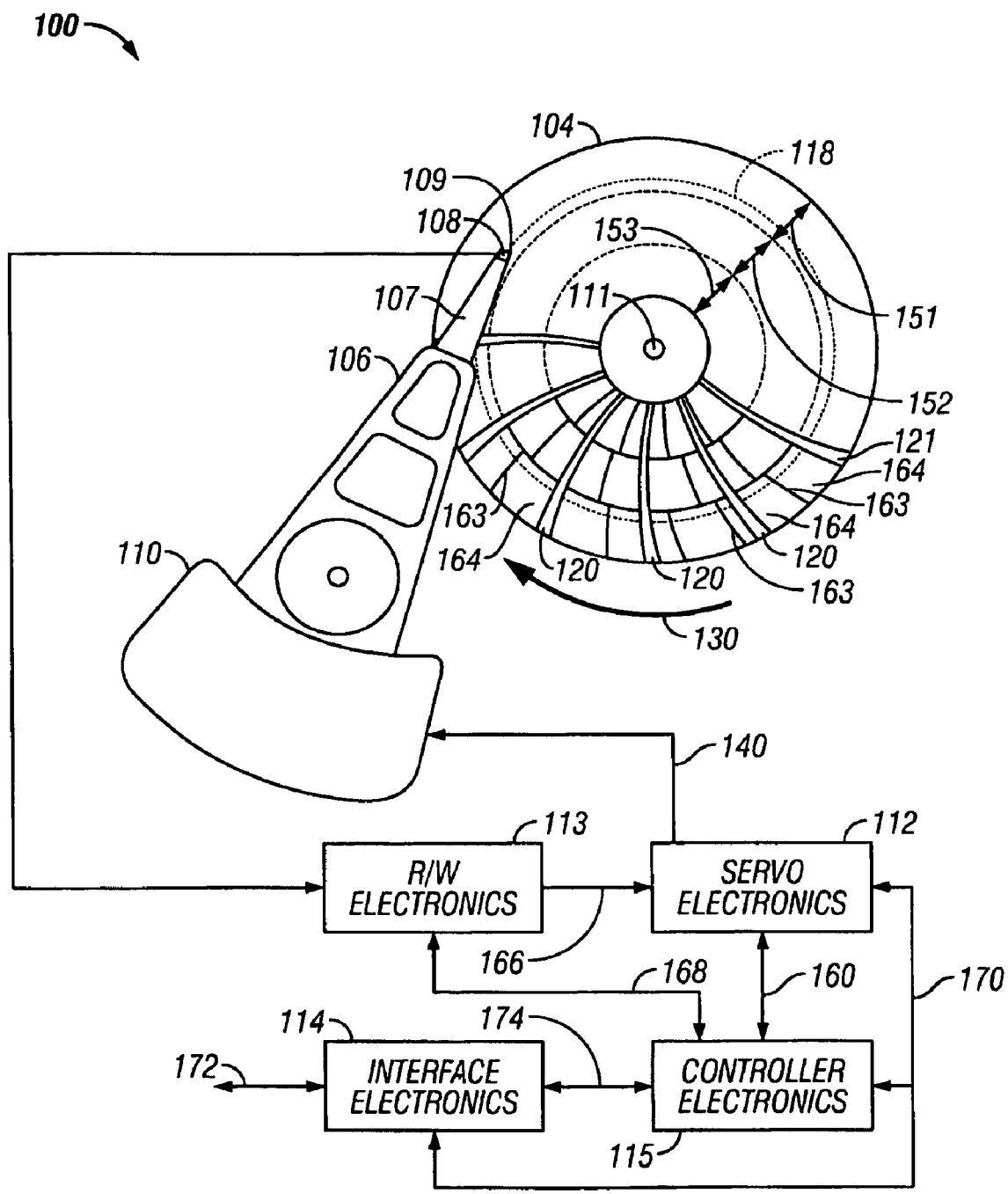
FIG. 1 is a schematic of a conventional magnetic recording disk drive illustrating the magnetic recording disk with nondata servo sectors and synchronization fields.

FIG. 1 is a schematic of a conventional magnetic recording disk drive and illustrates the magnetic recording disk with the nondata regions, specifically the servo sectors for positioning the recording heads on the data tracks and the synchronization fields for enabling the recording heads to read and write data in the data sectors. The disk drive, designated generally as 100, includes the magnetic recording disk 104, a voice coil motor (VCM) actuator 110, an actuator arm 106, a suspension 107, a head carrier or air-bearing slider 108 and a recording head 109. The recording head 109 is typically a combination of an inductive write head with a magnetoresistive read head (also called a read/write head) and is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. Only one disk surface with associated slider and recording head is shown in FIG. 1, but there are typically multiple disks stacked on a hub that is rotated by a spindle motor, with a separate slider and recording head associated with each surface of each disk.

Figure 2:
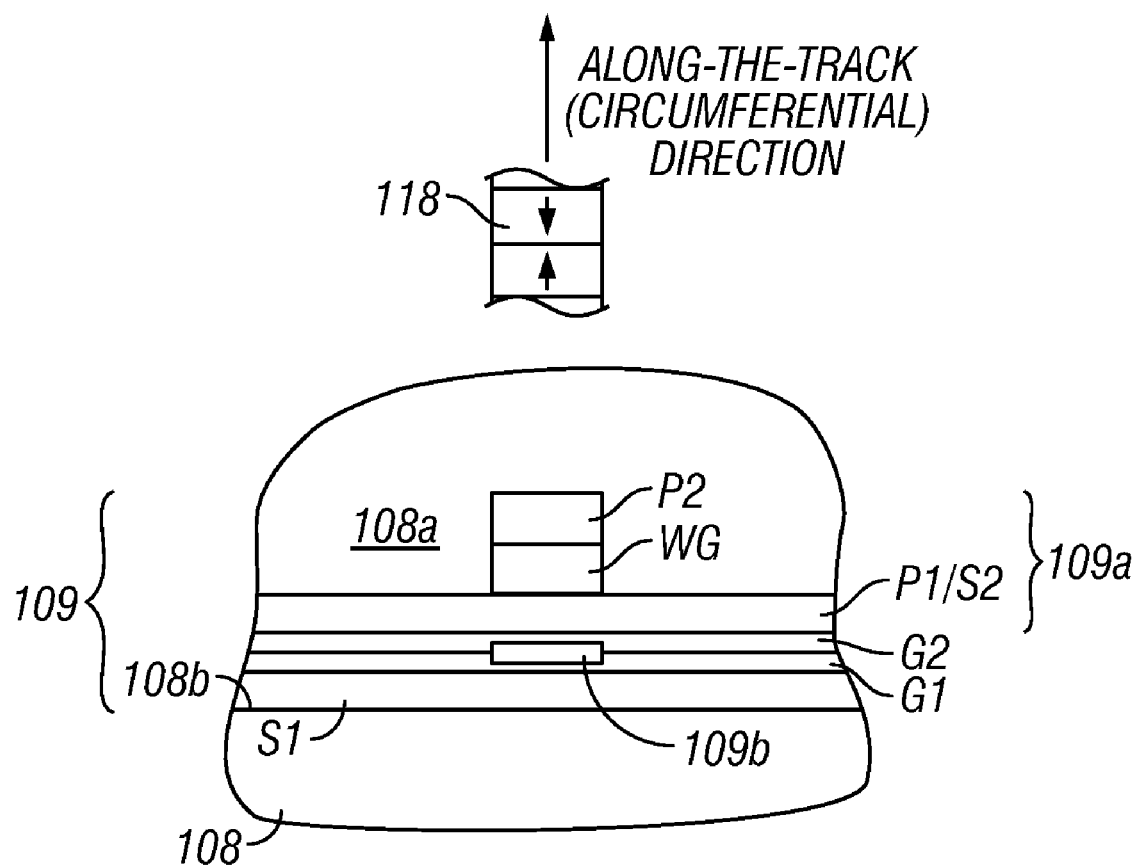
FIG. 2 is a view showing the disk-facing surface of the disk-drive slider with the ends of the read/write head and a portion of a data track as viewed from the surface of the disk.

FIG. 2 is a view showing the disk-facing surface 108a of slider 108 and the ends of head 109 as viewed from the surface of disk 104 superimposed with a portion of data track 118. The head 109 is a read/write head and is a series of thin films deposited and lithographically patterned on the end face 108b of slider 108. The write head 109a includes magnetic write poles P1/S2 and P1 separated by a write gap WG. When write current is directed to the write head 109a, a magnetic field is generated across WG in a direction along the data track 118.

The magnetoresistive sensor or read head 109b is located between two insulating gap layers G1, G2. Gap layers G1, G2 are located between magnetic shields S1 and P1/S2, with P1/S2 also serving as the first write pole for the write head 109a. Because shield S2 also serves as the pole P1, this type of read/write head is known as a "merged" head. If S2 and P1 are separate layers the read/write head is known as a "piggyback" head. Because the films making up head 109 are deposited sequentially on end face 108b of slider 108, there is a spacing D in the along-the-track or circumferential direction between the read head 109b and the write gap WG of write head 109a. The write head 109a depicted in FIG. 2 is a horizontal-recording write head for recording magnetizations in the plane of the recording layer on disk 104, as shown by the arrows in the section of data track 118. However, the write head may also be a perpendicular-recording write head with a perpendicular write pole (WP) that records magnetizations perpendicular to the recording layer on disk 104.

Referring again to FIG. 1, the disk 104 has a center of rotation 111 and is rotated in direction 130. The disk 104 has a magnetic recording layer with radially-spaced concentric data tracks, one of which is shown as track 118. Each data track has a reference index 121 indicating the start-of-track. The disk drive is illustrated as a zone-bit-recording (ZBR) disk drive because the data tracks are grouped radially into a number of annular data bands or zones, three of which are shown as zones 151, 152 and 153, but the invention is fully applicable to a disk drive that does not use ZBR, in which case the disk drive would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164.

Each data track also includes a plurality of circumferentially or angularly-spaced servo sectors 120 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have a generally arcuate shape in the generally radial direction that generally replicates the path of the head 109 as it is moved across the disk by the radial actuator 110. The servo sectors 120 are nondata regions on the disk that are magnetized once, typically during manufacturing or formatting of the disk, and are not intended to be erased during normal operation of the disk drive.

The electronics associated with disk drive 100 include read/write (R/W) electronics 113, servo electronics 112, controller electronics 115 and interface electronics 114. In the operation of disk drive 100, the R/W electronics 113 receives signals from head 109 and passes servo information from the servo sectors 120 to servo electronics 112 and data signals from the data sectors 164 to controller electronics 115. Servo electronics 112 uses the servo information to produce a current at 140 that drives VCM actuator 110 to position head 109. Interface electronics 114 communicates with a host system (not shown) over interface 172, passing data and command information. Interface electronics 114 also communicates with controller electronics 115 over interface 174. In the operation of disk drive 100, interface electronics 114 receives a request for reading from or writing to the data sectors 164 over interface 172. Controller electronics 115 receives a list of requested data sectors from interface electronics 114 and converts them into a set of numbers that uniquely identify the disk surface, track and data sector. The numbers are passed to servo electronics 112 to enable positioning head 109 to the appropriate data sector.

If the disk drive is a "headerless" architecture disk drive, meaning that the data sectors 164 do not contain unique data sector addresses that are required to be read before data can be read from or written to the data sectors, then once the servo electronics 112 has positioned head 109 over the appropriate data track, servo electronics 112 begins executing sector computations to locate and identify the desired data sector. In brief, in the headerless architecture approach, a servo timing mark (STM) at the beginning of the servo sectors 120 is used to locate servo sectors, and a count of STMs from a servo sector containing an index mark 121 uniquely identifies each servo sector. Once the desired data sector is thus identified, the sync field preceding that data sector is detected to control the timing of data bits read from the data sector or data bits written to the data sector.

Conventional magnetic recording disk drives use disks with "continuous" media, meaning that the magnetic recording layer is a continuous film of magnetizable material. In conventional continuous-media disks the concentric data tracks are not physically separated from one another and are not pre-formed in the recording layer, but are formed when the write fields from the write head create the magnetizations in the continuous magnetic layer. A continuous-media disk may also be a "discrete-track" disk, meaning that the concentric data tracks of continuous magnetic material are radially separated from one another by concentric nonmagnetic guard bands. Discrete-track magnetic recording disks are known in the art, as described for example in U.S. Pat. No. 4,912,585. In a discrete-track disk, the nonmagnetic guard bands may be trenches or grooves, or formed of nonmagnetic material, or contain magnetic material but have surfaces far enough below the surfaces of the data tracks to not adversely the readback signals from the data tracks.

However, magnetic recording disks with "patterned" media have been proposed to increase the data density. In patterned media, the magnetizable material on the disk is patterned into small isolated islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In patterned media, the data sectors as well as the nondata regions are patterned. However, it is also possible to fabricate a continuous-media disk wherein just the nondata regions are patterned. This type of continuous-media disk may have either conventional concentric data tracks, or discrete data tracks separated by nonmagnetic guard bands, but the nondata regions are patterned. An example of a discrete-track disk with patterned servo regions is described in U.S. Pat. No. 4,912,585.

Figure 3:
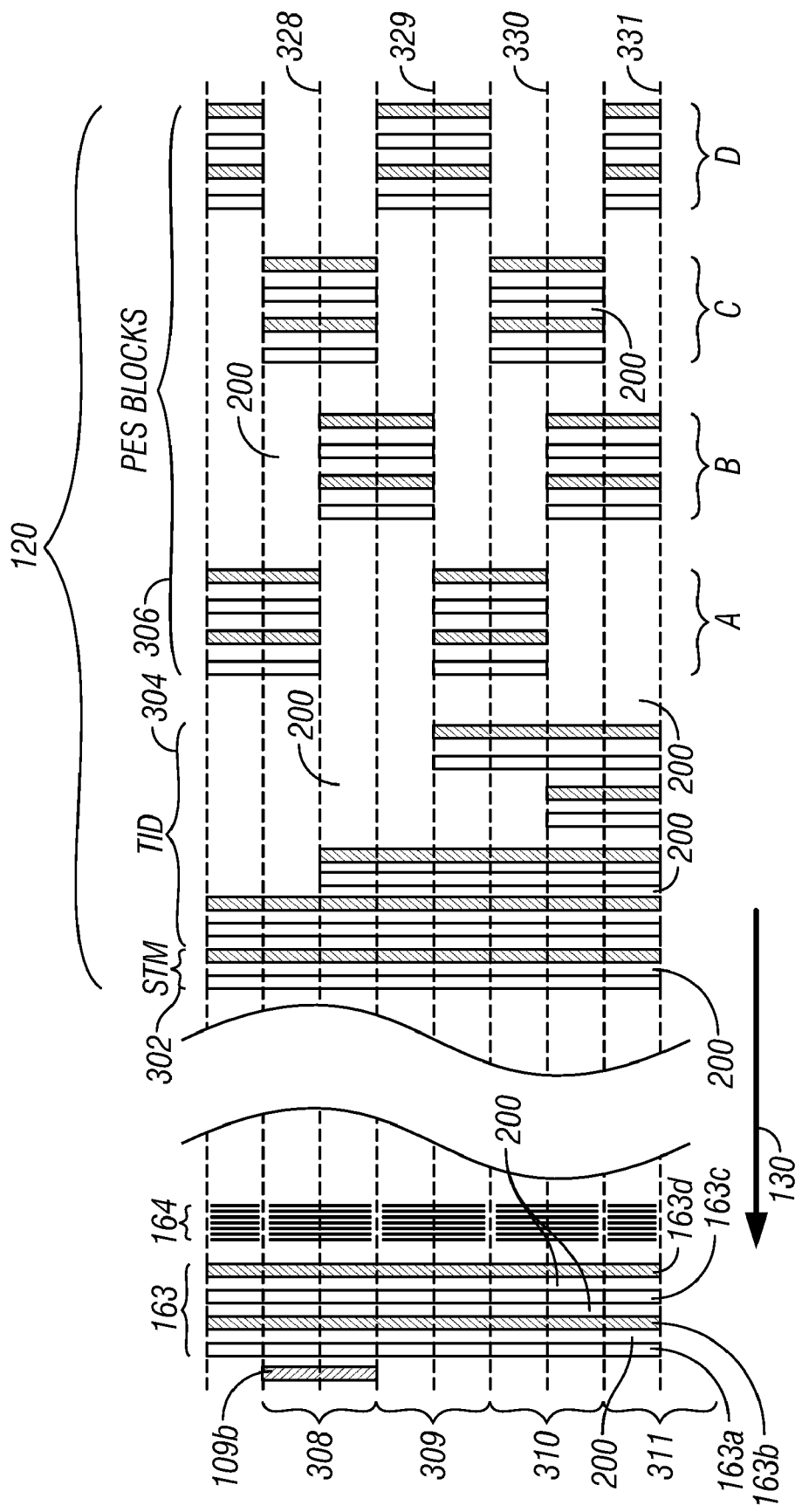
FIG. 3 is a schematic showing a portion of a patterned-media disk with a patterned sync field and a patterned servo sector spanning several data tracks with nondata islands having alternating polarity in the along-the-track direction.

FIG. 3 is a schematic showing a portion of a patterned-media disk with a patterned sync field 163 and a patterned servo sector 120 spanning several data tracks, as described in pending application Ser. No. 11/148,918, published as US2006/0280975 A1 and assigned to the same assignee as this application. Four full data tracks are depicted: 308, 309, 310 and half-track 311, each having a respective track centerline 328, 329, 330 and 331. The read head 109b is shown as positioned in data track 308 and will detect the islands in sync field 163 and servo sector 120 as the disk rotates in the direction of arrow 130.

The sync field 163 is depicted as a pattern with four sync marks or radial stripes as magnetized nondata islands 163a-163d separated by nonmagnetic spaces. The sync marks are stripes that extend across the data tracks in the radial direction, resulting in a single-frequency pattern suitable for locking a phase-locked-loop data clock prior to reading or writing data bits in the data sectors. The sync field 163 precedes the data sector 164, which shows several data islands, represented as solid lines.

The servo sector 120 is a conventional servo pattern of the type commonly used in sector servo systems and shows a greatly simplified pattern for clarity. The servo pattern includes several fields containing nondata islands, three of which are shown as servo-timing-mark (STM) field 302, track ID (TID) field 304 and position-error-signal (PES) field 305 depicted as the well-known quadrature pattern of PES bursts or fields A-D. The islands in each burst or field A-D are used to determine the fractional part of the radial position of the head. When the head is at the track centers the read-back signal amplitudes from the A islands and the B islands are equal. When the head is at the half-track positions the amplitudes from the C islands and the D islands are equal. As the head moves off-track the amplitudes from all the islands will increase or decrease. The amplitudes of the PES islands are decoded in servo electronics 112 and used to reposition the head.

In FIG. 3 all of the islands in sync field 163, data sector 164 and servo sector 120 are discrete islands of magnetic material. Alternating islands (shown with cross-hatching) are magnetized in the opposite direction to the magnetization of the other islands. Thus the magnetizations in the non-cross-hatched islands are antiparallel to the magnetizations in the cross-hatched islands. For perpendicular recording, if the magnetizations in the non-cross-hatched islands are out-of-the paper in FIG. 3, then the magnetizations in the cross-hatched islands would be into-the-paper. For horizontal recording, if the magnetizations in the non-cross-hatched islands are to the right in the along-the-track direction in FIG. 3, then the magnetizations in the cross-hatched islands would be to the left. Each discrete island is a magnetized island separated from other islands by nonmagnetic spaces represented as 200. The term "nonmagnetic" means that the spaces 200 between the islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces 200 may also be the absence of magnetic material, such as grooves or troughs in the magnetic recording layer or disk substrate.

As shown schematically in FIG. 3, the PES blocks in servo sector 120 have a frequency (servo frequency) substantially lower than the data frequency (the frequency of the data islands in data sector 164). This is because for a given resolution of the read head 109b, a modern partial-response (PR) read channel in R/W electronics 113 can handle linear bit densities with a period several times greater than the resolution of the read head. However, to clearly resolve individual pulses, which is beneficial for data synchronization and PES decoding, the period of the nondata servo islands should be close to the resolution of the read head. Near the inside diameter (ID) of the disk, the servo frequency will be closer to the data frequency, but the frequency of both will be limited by the maximum linear density of the disk. However, with increasing radial position from the ID, the data frequency increases relative to the servo frequency because the servo frequency is constant and the data frequency increases generally linearly with radius.

Figure 4A:
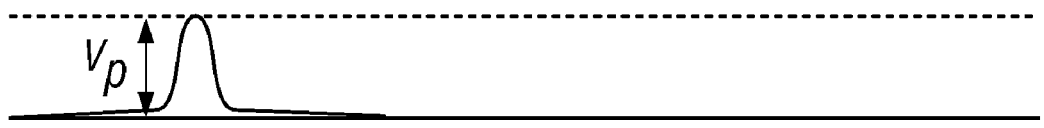
FIG. 4(a) is a representative signal from a single perpendicularly magnetized nondata island.
Figure 4B:
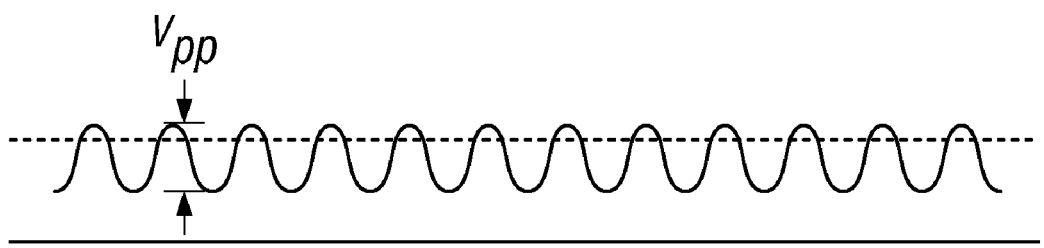
FIG. 4(b) is a representative signal from a series of nondata islands if all the islands were magnetized in the same perpendicular direction so that their magnetizations had a single polarity.
Figure 4C:
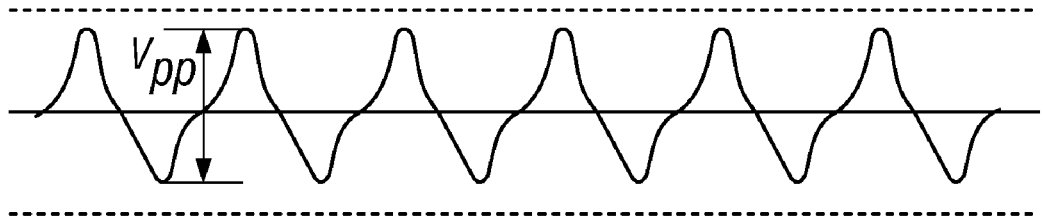
FIG. 4(c) is a representative signal from a disk according to the present invention with the nondata islands having alternating perpendicular magnetization directions so that two adjacent islands along a track have opposite polarity.

FIG. 4(a) is representative of the signal detected by read head 109b as a single magnetized nondata island of FIG. 3 passes the read head. The isolated pulse response $V_p$ shown is for a perpendicularly-magnetized island. If the nondata islands repeat with a certain period, and all islands were not magnetized with alternating polarity as in FIG. 3, but were magnetized in the same perpendicular direction so that their magnetizations had a single polarity, then a series of pulses as shown in FIG. 4(b) would be detected by read head 109b. Note that the peak-to-peak amplitude $V_{pp}$ is smaller than the isolated pulse response $V_p$. However, when the nondata islands are magnetized in the alternating perpendicular directions so that two adjacent islands have opposite polarity, then a series of pulses as shown in FIG. 4(c) will be detected by read head 109b. Note that the peak-to-peak amplitude $V_{pp}$ in FIG. 4(c) is more than double the peak-to-peak amplitude $V_{pp}$ in FIG. 4(b). If most of the noise in the recording system is not data-dependent, and therefore constant between the examples of FIGS. 4(b) and 4(c), then the signal-to-noise ratio will be significantly better for the example of FIG. 4(c) with alternating polarity. Because the instantaneous signal-to-noise ratio can be traded off against the length of the pattern, it will be possible to achieve the desired performance targets with shorter data sync and servo patterns, leaving more disk real estate for data sectors.

The PES Field Patterns

This invention relates to a disk and disk drive with patterned nondata islands having alternating polarity like that shown in FIG. 3, but with a phase-type PES field and methods for demodulating the signal from the PES field. The disk may be a patterned-media disk with both pre-patterned data islands and pre-patterned nondata islands, a continuous-media disk with conventional continuous-media data tracks and pre-patterned nondata islands, or a continuous-media disk with discrete data tracks and pre-patterned nondata islands.

Figure 5A:
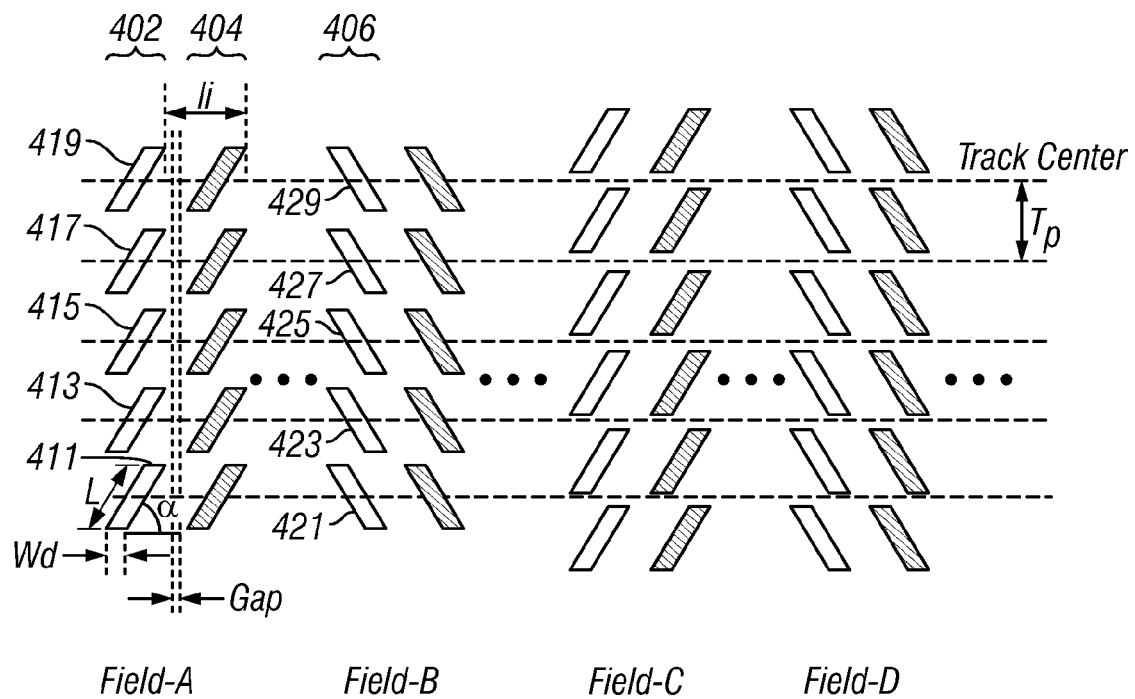
FIG. 5A is an illustration of the position error signal (PES) field according to the present invention with portions of each burst or PES field A, B, C and D showing the radial stripes with the slanted orientation of the parallelogram-shaped islands having a radial height of approximately one track width or track pitch (Tp) and the interval of the centers of the islands in the radial direction is Tp.
Figure 5B:
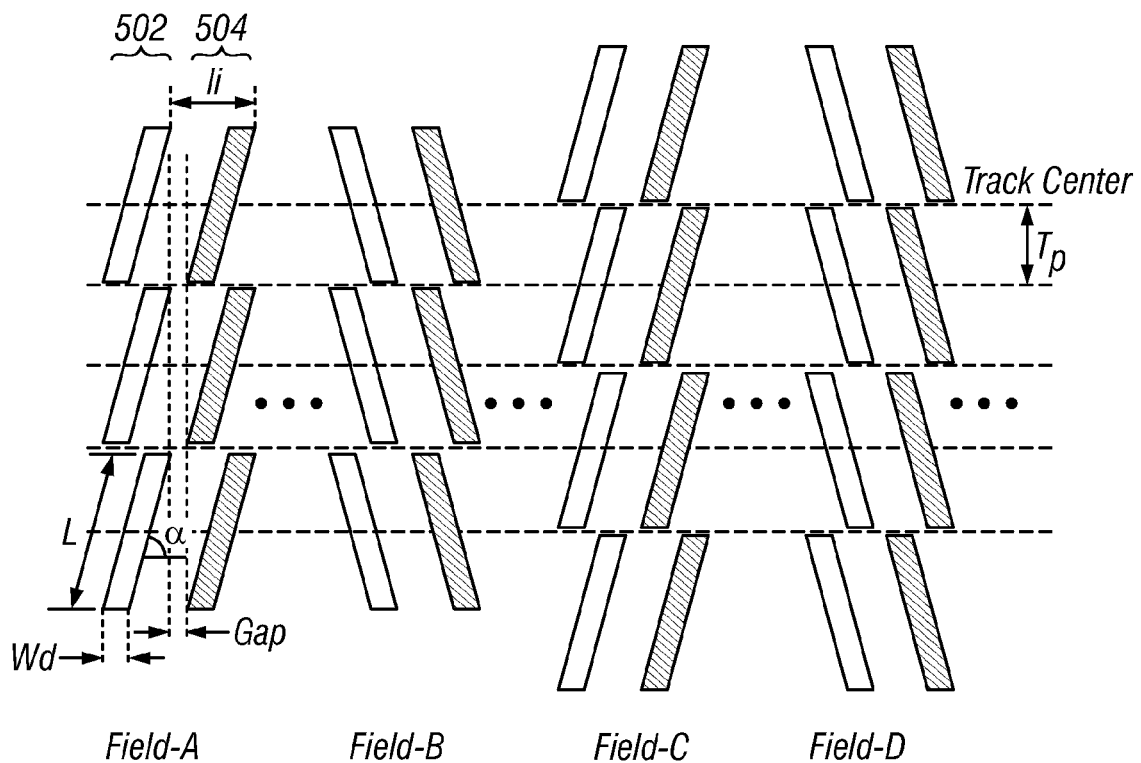
FIG. 5B is an illustration of the position error signal (PES) field according to the present invention with portions of each burst or PES field A, B, C and D showing the radial stripes with the slanted orientation of the parallelogram-shaped islands having a radial height of approximately twice Tp and the interval of the centers of the islands in the radial direction is twice Tp.

FIGS. 5A and 5B show the PES field with portions of each burst or PES field A, B, C and D. Each of the four fields (Field-A, Field-B, Field-C, and Field-D) will have a plurality or "bursts" of generally radially directed stripes that extend generally radially across a plurality of data tracks, but only two stripes are shown for each field. The stripes extend in the generally radial direction across the disk and preferably have an arcuate shape that generally replicates the path of the head as it is moved across the disk by the radial actuator (as shown by servo sectors 120 in FIG. 1A). The number of stripes depends on how much noise is in the pattern readback signal. If there are more stripes in each field, the phase measurements can be averaged to reduce the signal error due to noise. The stripes have alternating polarity in the circumferential or along-the-track direction, with the different polarities being represented by cross-hatching and non-cross-hatching.

Each stripe, like stripes 402, 404, 406 in FIG. 5A and stripes 502, 504 in FIG. 5B, is a plurality of discrete radially-spaced blocks or islands. The stripes extend generally radially across the entire disk (or entire zone). Each island is generally parallelogram-shaped with its length L slanted or oriented at an acute angle relative to the track centerline. The islands in Field-A and Field-C (like islands 411, 413, 415, 417, 419 in stripe 402) are slanted in the same direction and the islands in Field-B and Field-D (like islands 421, 423, 425, 427, 429 in stripe 406) are slanted in the opposite direction. The diagonal orientation of the islands is at an acute angle (the island angle α) relative to the along-the-track direction. In FIG. 5A, the radial spacing of the centers of the islands is the track pitch Tp and the radial height of the islands is approximately Tp, but the radial height may be between one-half Tp and Tp. If each island has a radial height slightly less than Tp, then there is a radial gap between adjacent islands in each stripe, but this radial gap is significantly smaller than the radial width of the read head, so that the radial gaps between islands do not significantly affect the servo readback signal. In FIG. 5B, the radial spacing of the centers of the islands is twice Tp and the radial height of the islands is approximately twice Tp, but the radial height may be between Tp and twice Tp. The design of the radial height of the stripe islands depends on the target track pitch, read head geometry, and characteristics of the read head. Each stripe is a series of discrete radially-spaced parallelogram-shaped islands. The two island shapes are congruent parallelograms, but they are placed in opposite orientation in the circumferential direction. (Line symmetry is the radial line that is perpendicular to the track centerline.) The circumferential interval "Ii" between the islands in each field is the same at one radial location, and this interval is proportional to the radial distance "r" from the center of the disk. This means essentially that the radial stripes are generally equally angularly spaced apart.

The pattern of the stripes in Field B is the mirror image about a radial line of the pattern of the stripes in Field A. Similarly, the pattern of the stripes in Field D is the mirror image about a radial line of the pattern of the stripes in Field C. The islands in the pair of fields C and D are shifted radially from the islands in the pair of fields A and B. Thus, as shown in FIG. 5A, the islands have a radial height of approximately Tp but the centers of the islands are radially spaced by exactly Tp. The radial stripes in the pair of fields C and D are shifted radially by one-half Tp from the radial stripes in the pair of fields A and B. In FIG. 5A, the islands in Field-A and Field-B are centered radially at the track centerlines, and the islands in Field-C and Field-D are centered radially at the midlines halfway between adjacent track centerlines. As shown in FIG. 5B, the islands have a radial height of approximately 2*Tp but the centers of the islands are radially spaced by exactly 2*Tp. The radial stripes in the pair of fields C and D are shifted radially by Tp from the radial stripes in the pair of fields A and B. In FIG. 5B, the islands in Field-A and Field-B are centered radially at alternate track centerlines (e.g., even-numbered tracks), and the islands in Field-C and Field-D are centered at the other track centerlines (odd-numbered tracks). For the explanations that follow the example used will be for the pattern shown in FIG. 5A.

PES demodulation is done by a phase measurement method. Field-A and Field-B phase patterns are used for creating the "mPES" (main position error signal), which is proportional to the read head offset from the track centerline. Field-C and Field-D phase patterns are used for creating "sPES" (substitute position error signal), which is proportional to the read head offset from the midpoint of two adjacent tracks. By using mPES and sPES, the position error signal can cover the read head offset in the entire track width.

Figure 6A:
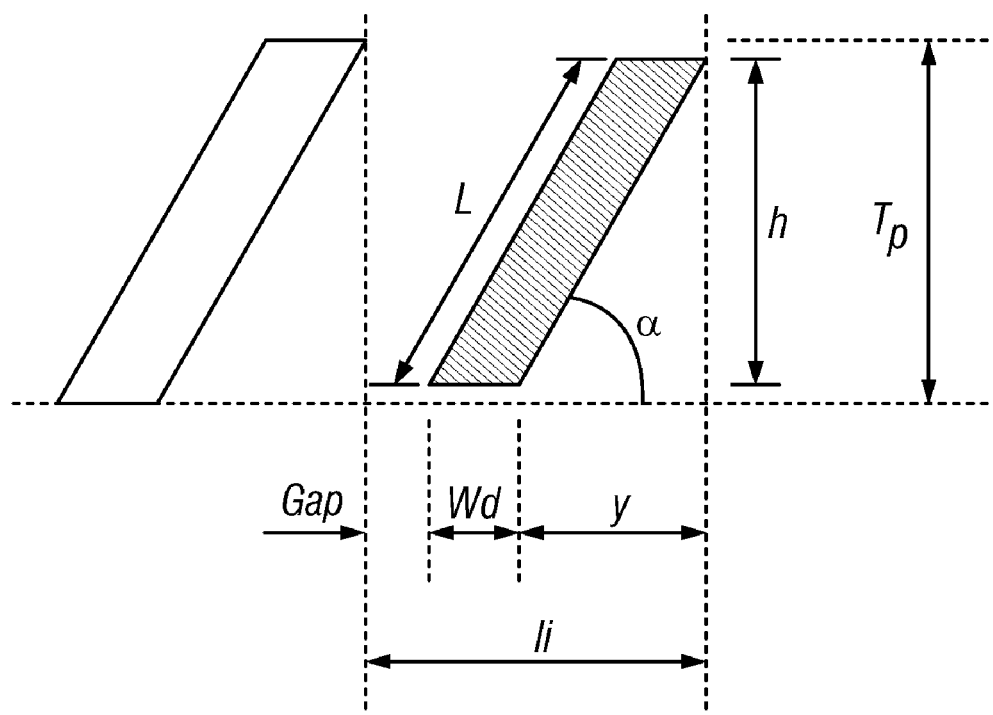
FIG. 6A is a detailed illustration of a parallelogram-shaped island that form the radial stripes in the PES fields showing its length "L" oriented at an acute angle relative to the track centerline.
Figure 6B:
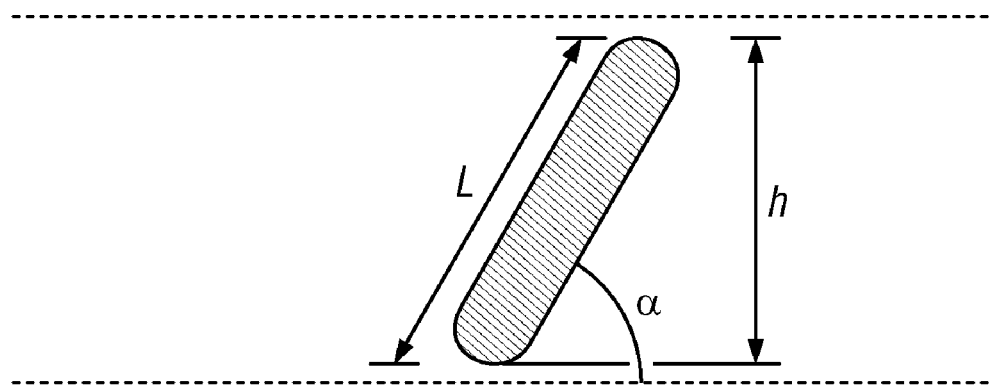
FIG. 6B is an illustration of the parallelogram-shaped island having a generally rectangular shape and showing rounded corners that form the radial stripes in the servo fields.

In FIGS. 5A-5B, "Tp" represents the radial spacing between adjacent tracks, i.e., the track pitch (nm), "Ii" represents the island circumferential interval (nm), "Wd" represents the parallelogram island width (nm) in the circumferential direction, "gap" is the gap between two circumferentially adjacent islands (nm), the angle "α" is the angle of orientation of the island relative to the track centerline (deg), and the term "y" is defined below. The parallelogram island shape depends on the target track pitch Tp, the read head geometry, and read head sensitivity characteristics. FIG. 6A shows the parallelogram island geometry in more detail. In FIG. 6A, the islands are depicted as "perfect" parallelograms with relatively sharp corners. It is difficult to pattern the islands with very sharp corners so in actuality these corners would be somewhat rounded. Also, the parallelogram may be a rectangle. FIG. 6B shows an example of a generally rectangularly shaped island with rounded corners. The rounded corners do not adversely affect the demodulation of the servo readback signal.

The mPES and sPES are given by the following equations:

$$mPES = gain\_h * (ph\_A - ph\_B)/(2*Xa) \quad \text{Equation (1)}$$

$$sPES = gain\_h * (ph\_C - ph\_D)/(2*Xa) \quad \text{Equation (2)}$$

where "gain_h" is a slope correction factor, "ph" is the phase measurement from the associated field and "Xa" is the phase change per track (deg/track).

It is desirable to keep Xa constant as a function of radius, i.e. constant for each track. To explain how this is accomplished in this invention, the following terms are defined:

$$y = Ii * Xa * h/(180*Tp) \text{ (units are nm)} \quad \text{Equation (3)}$$

$$Ii = Wd + gap + y \text{ (units are nm)} \quad \text{Equation (4)}$$

h=height of island in radial direction (nm)
k1: ratio of Wd to Ii (no units)
k2: ratio of gap to Ii (no units)
k: ratio of Ii to r (no units)
r: radius from center of disk (nm)

The circumferential interval Ii (nm) is proportional to r. Thus, $Ii=2\pi*k*r$, which assures that the readback signal when the read head detects the islands is constant for the entire disk (or zone if there are multiple annular data zones or bands, like zones, 151, 152, 153 in FIG. 1A). In the case where there are multiple zones, the value of "k" is different in each servo zone, and the servo pattern readback signal frequency is constant within a zone but different for each zone.

By use of the constants k, k1 and k2, Wd and gap can be designed to also be proportional to r.

$$Wd = k1*Ii \text{ (units are nm)} \quad \text{Equation (5)}$$

$$gap = k2*Ii \text{ (units are nm)} \quad \text{Equation (6)}$$

Then from Equation (4), $$Ii = (k1 + k2 + Xa*h/(180*Tp))*Ii \text{ (nm)}, \quad \text{Equation (7)}$$

and $$k1 + k2 + Xa*h/(180*Tp) = 1 \quad \text{Equation (8)}$$

$$Ii = 2\pi*k*r \text{ (nm)} \quad \text{Equation (9)}$$

$$Wd = 2\pi*k*k1*r \text{ (nm)} \quad \text{Equation (10)}$$

$$gap = 2\pi*k*k2*r \text{ (nm)} \quad \text{Equation (11)}$$

$$y = Ii*Xa*h/(180*Tp) \text{ (nm)} \quad \text{Equation (12)}$$

$$\alpha = \tan^{-1}(h/y) = \tan^{-1}[(180*h)/(Ii*Xa)] \text{ (radians)} \quad \text{Equation (13)}$$

Figure 7:
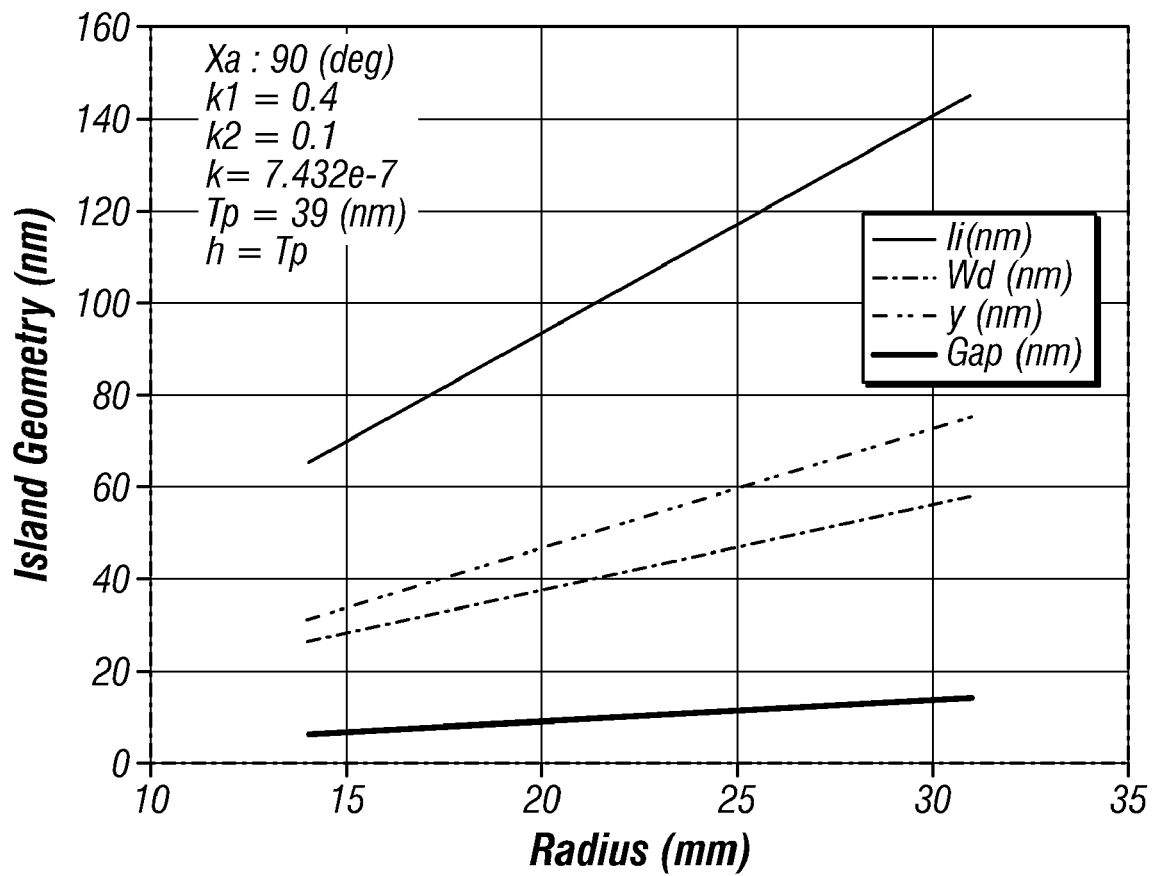
FIG. 7 is a graph of the parameters Ii, Wd, gap and y, shown in FIG. 6A, as a function of r for one design example.
Figure 8:
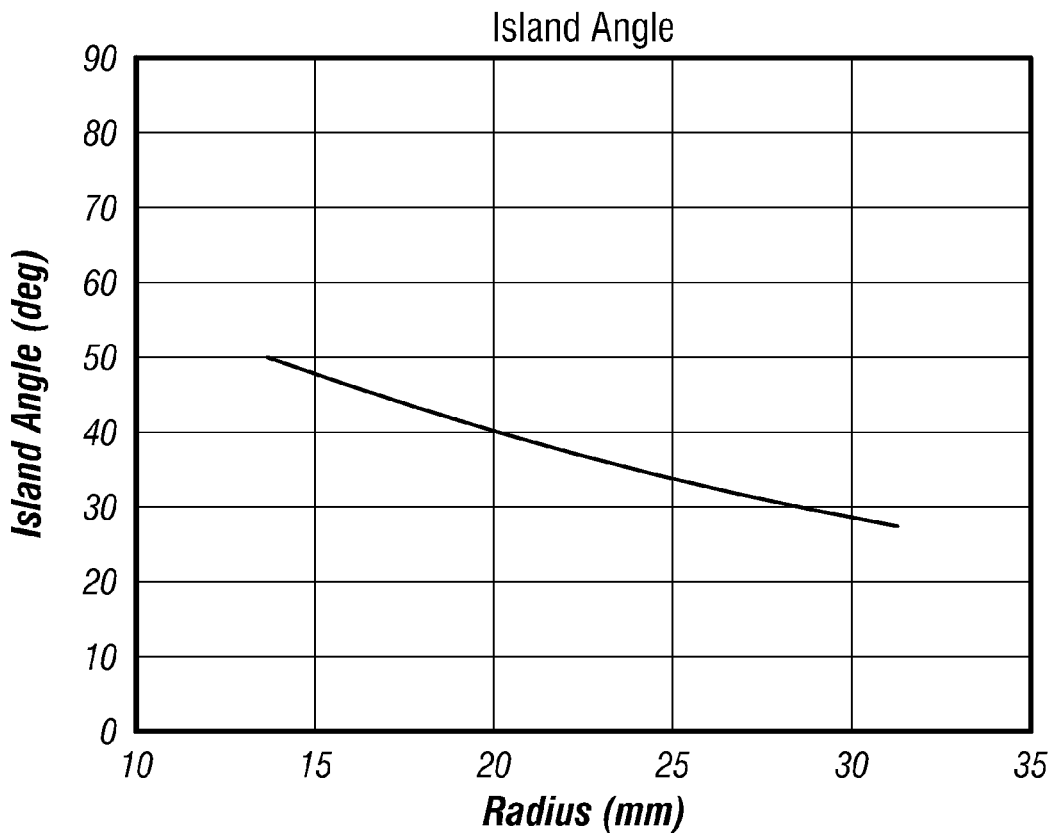
FIG. 8 is a graph of the island angle α, shown in FIG. 6A, as a function of r for one design example.

FIG. 7 shows the variation of Ii, Wd, gap and y as a function of r, and FIG. 8 shows the variation of the island angle α as a function of r, for one design example where Tp=39 nm and Xa=90 degrees. In this example, the distance from the disk center to where the PES fields are located is between 13.9 mm and 31.2 mm. These are typical dimensions for a 2.5" form-factor disk drive.

Demodulation Method Using All Four Fields A, B, C and D

Figure 9:
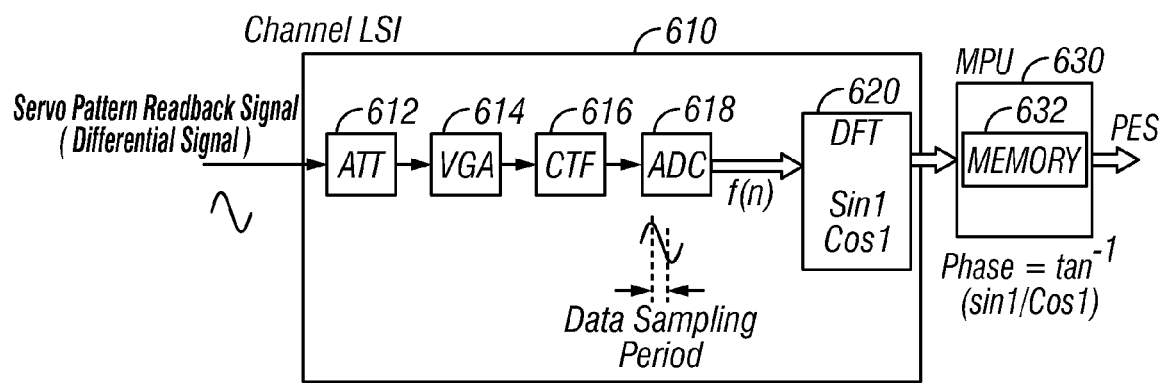
FIG. 9 is a block diagram of the hardware for calculating the phase and PES from the servo readback signal.

The demodulated PES is proportional to radial movement of the read head, and this relationship is close to linear. By applying the slope correction "gain_h", the demodulated mPES and sPES can be connected smoothly as a line across the entire track width. FIG. 9 shows one example of the phase measurement hardware. This is based on digital sampling and discrete Fourier Transform (DFT) calculation. In this example, data sampling and the DFT function is in the data channel large-scale integrated circuit chip (LSI) 610, corresponding to the R/W electronics block 113 (FIG. 1A), and the phase calculation is performed in the microprocessor (MPU) 630, corresponding to servo electronics 112 and controller electronics 115 (FIG. 1A). However, all of the calculations may be performed by a single digital signal processor (DSP) or microprocessor with associated memory, like memory 632 associated with MPU 630, for storing computer program instructions for performing the calculations.

The servo pattern readback signal (like that shown in FIG. 4C) goes to the channel LSI 610 and is input to the attenuator (ATT) 612. ATT 612 roughly adjusts the input signal amplitude in the adjustable signal range of the variable gain amplifier (VGA) 614. VGA 614 then adjusts the input signal amplitude in some pre-defined amplitude range. The continuous time filter (CTF) 616 is a low-pass filter that band limits higher-frequency noise prior to sampling. Then the signals are sampled at the constant sampling rate, and converted to digital by analog-to-digital converter (ADC) 618.

Then the DFT is performed for the sampled digital data at DFT block 620. For the phase measurement, it is only necessary to calculate the primary frequency of the readback signal. This is given by the following:

$$F_1 = \left(\frac{1}{N}\right)\sum_{n=0}^{N-1} f(n)\cos\left(\frac{2\pi n}{N}\right) - j\left(\frac{1}{N}\right)\sum_{n=0}^{N-1} f(n)\sin\left(\frac{2\pi n}{N}\right) \quad \text{Equation (14)}$$

where
j: imaginary unit
f(n): sampled readback signal
N: number of samples per cycle of the readback signal
M: total sampling number (usually a multiple of N)

From Equation (14), the phase measurement calculations are expressed as follows, using the DFT calculation for the primary frequency.

$$\text{phase} = \tan^{-1}\left(\frac{\sin 1}{\cos 1}\right) * 180/\pi \text{ (degrees)} \quad \text{Equation (15)}$$

$$\cos 1 = \sum_{n=0}^{M-1} f(n)\cos\left(\frac{2\pi n}{N}\right) \quad \text{Equation (16)}$$

$$\sin 1 = -\sum_{n=0}^{M-1} f(n)\sin\left(\frac{2\pi n}{N}\right) \quad \text{Equation (17)}$$

The number "M" is the total sampling number, and is usually set to a multiple of "N". By choosing a large number for M, the phase measurements can be averaged to reduce the noise. For example, if there are 24 stripes in each burst, and 8 data samples per one cycle of the readback signal, then M can be equal to (24/2)*8=96.

Figure 10:
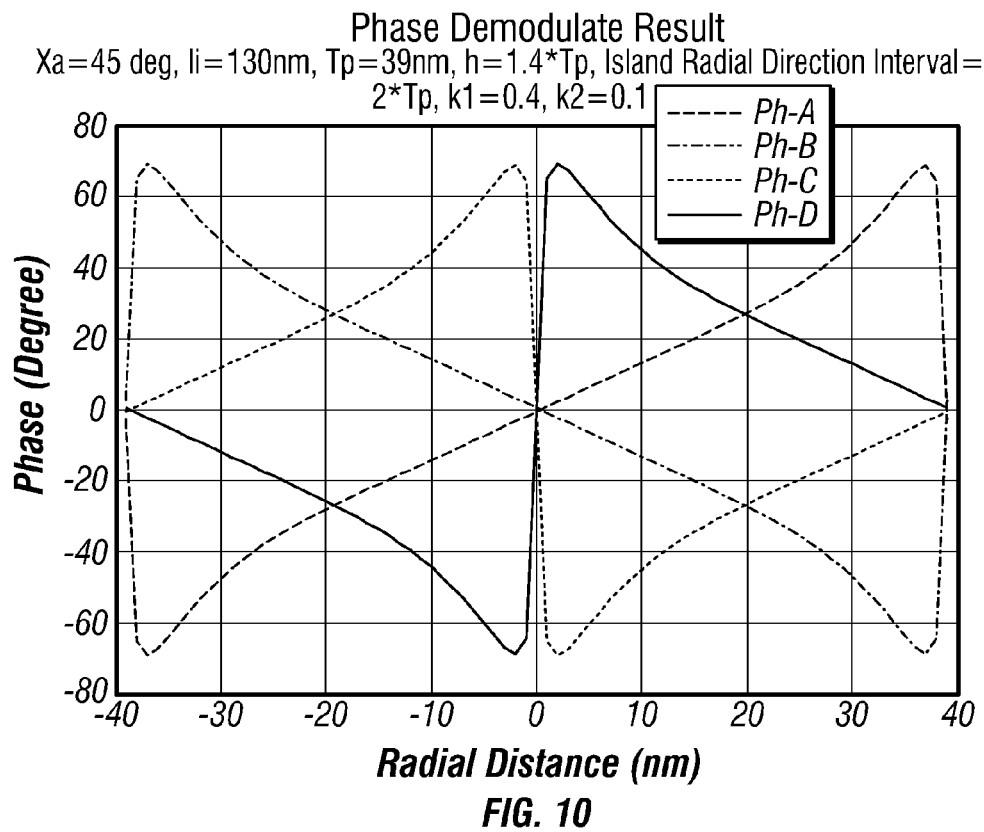
FIG. 10 is a graph of the measured phase values for each of the four fields A, B, C and D as a function of radial distance from the track centerline.

The next step is calculating mPES and sPES in MPU 630 from Equations (1) and (2). The term "Xa" is designed to be the phase change per one track pitch with one phase pattern field (Field-A or Field-B or Field-C or Field-D). In this case, each mPES and sPES is calculated by subtracting two field phase values. By subtracting the phase of one field, the sampling start timing error is canceled. Also, the PES values in these equations are normalized. Thus a PES value of 1 corresponds to one track pitch. FIG. 10 shows the measured phase values for each of the four fields as a function of radial distance from the track centerline.

Figure 11:
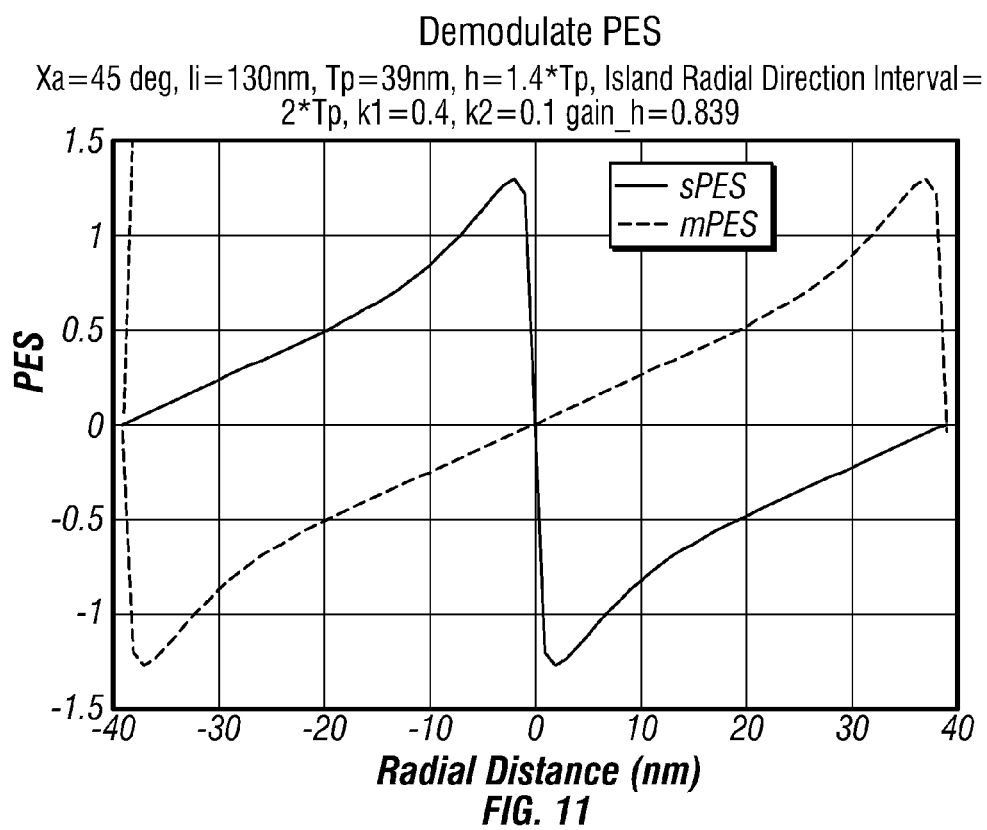
FIG. 11 is a graph of calculated main PES (mPES) and substitute PES (sPES) as a function of radial distance from the track centerline using all four fields A, B, C and D.
Figure 12:
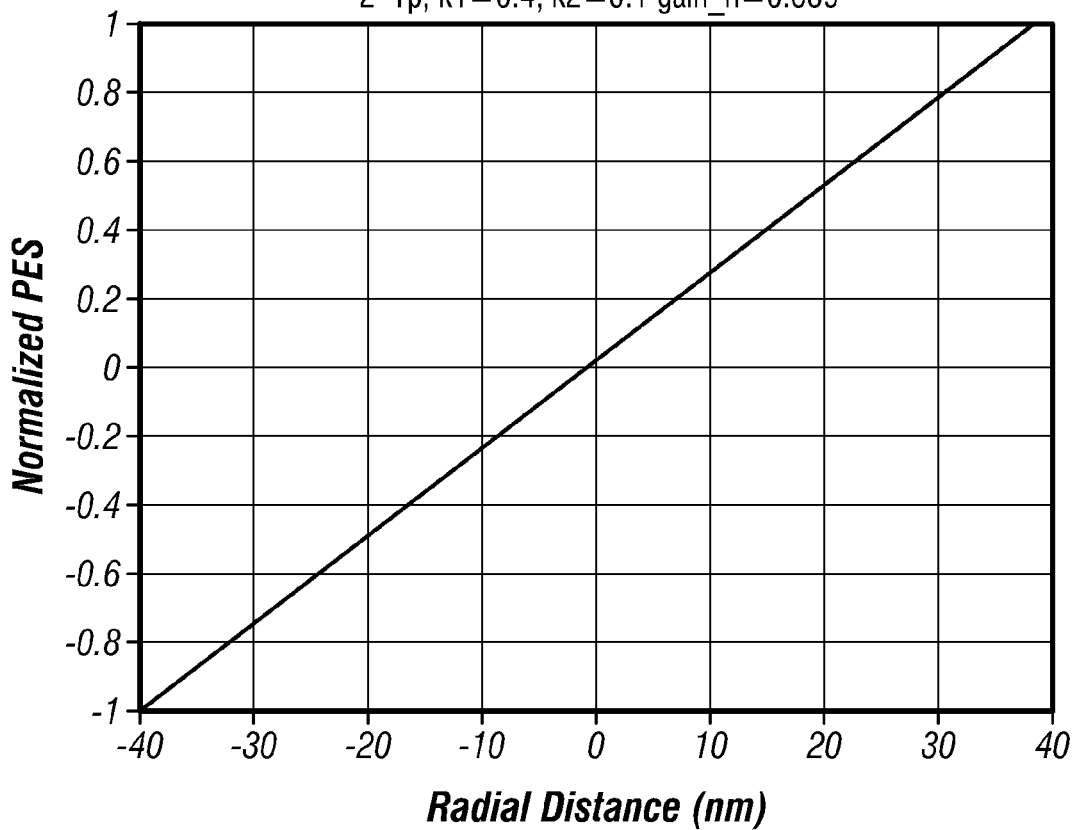
FIG. 12 is a graph of normalized PES as a function of radial distance from the track centerline using all four fields A, B, C and D.

The mPES is calculated by the phase difference between Field-A and Field-B and the sPES is calculated by the phase difference between Field-C and Field-D. For the case where the radial interval of the island equals the single-track pitch, mPES is proportional to the read head offset from the track centerline, and sPES is proportional to the read head offset from the midpoint of two track centerlines. For the case where the radial interval of the island equals the twice of the single-track pitch, mPES is proportional to the read head offset from the odd track centerline, and sPES is proportional to the read head offset from the even track centerline. (Odd and even are reversible.) FIG. 11 shows the mPES and sPES calculations as a function of radial distance from the track centerline. In this figure, the radial interval of the islands equals twice Tp. For the final PES calculation, one or the other of the calculated mPES and sPES values is selected, depending on the read head radial location. The PES to be used is selected from either the mPES or sPES, depending on which one has the lower absolute value. For example, if the absolute value of (ph_A−ph_B) is less than the absolute value (ph_C−ph_D), this indicates that the read head is located closer to an odd track centerline. Conversely, if the absolute value of (ph_C−ph_D) is less than the absolute value (ph_A−ph_B), this indicates that the read head is located closer to an even track centerline. The sign of the selected mPES or sPES is then multiplied by −1 if the slope of the selected mPES or sPES curve is negative for that value. For example, referring to FIG. 11, if the read head is located at +5 nm, the mPES has an absolute value of about 0.15 and the sPES has an absolute value of about 1.1, so mPES is selected. Similarly, if the read head is located at 30 nm, which is the next track, the mPES has an absolute value of about 0.8 and the sPES has an absolute value of about 0.20, so sPES is selected. The slope of mPES and sPES are pre-determined by the direction of the parallelogram-shaped islands. Finally, if the selected PES is the sPES value, then a value corresponding to the one-track constant offset is summed (added or subtracted) with the PES. For example, if one track corresponds to a PES of 1 then a constant offset value of 1, corresponding to one track, is summed with the PES. FIG. 12 shows the final PES demodulation result.

The term "gain_h" in Equations (1) and (2) is the slope correction gain. In the actual demodulation of the PES fields, the phase change amount per track (Xa) does not completely match the theoretical phase pattern equations. This is because of the relatively small radial height of the parallelogram-shaped island. But the demodulated PES is basically proportional to the read head movement around the center of the island, and this relationship is close to linear. Thus, by applying the slope correction "gain_h", the demodulated mPES and sPES can be connected smoothly as a straight line across the entire track width. This "gain_h" value has some range between about 0.5 to about 3. The value mainly depends on the Ii and island angle α, which as explained above change with radius r. To cover the entire disk, "gain_h" must be calibrated depending on the PES field's radial location. By selecting proper "gain_h", mPES and sPES can be connected smoothly to make one straight line. This is shown in FIG. 12 as the normalized PES as a function of radial distance from the track centerline. This "gain_h" calibration operation is very similar to that used for the conventional quadrature PES burst pattern.

Demodulation Method Using Any Three of Four Fields A, B, C and D

In another implementation of the invention the PES stripes and islands are as explained above, but the complete PES field has only three of the four Fields A, B, C and D, and the demodulation method is modified from the above. The elimination of one of the fields reduces the amount of disk space needed for servo information, thus increasing the amount of disk space available for data. This burst pattern portion can have any combination of three bursts out of the conventional four bursts (A, B, C, D).

Each of the stripes is placed at the circumferential interval Ii. The stripe interval at the boundary of the each field (Ib) is defined as n*Ii, and in the example explained below n=2. The rule of this interval is described by the following equation:

$$Ib = Ii * k3 * (m/2) \text{ (nm)} \qquad \text{Equation (18)}$$

The term "Ib" depends on "m", the number of data samples per readback signal, and assumes alternating polarity of the magnetized stripes. The term "Ii" is proportional to the pattern's radial distance from the center of the disk, i.e., the stripes are generally equally angularly spaced apart, so that the servo pattern readback signal frequency is the same across the entire disk. Thus in this three-burst pattern Ib is also proportional to the pattern's radial distance from the center of the disk. In Equation (18), "k3" is some constant that is a natural number. For example, if m=8 (8 data samples during one cycle of the readback signal), then theoretically Ib can be ¼*Ii, ½*Ii, ¾*Ii, Ii, 1¼*Ii, 1½*Ii, etc. However, Ib should be greater than Ii to avoid the signal interference from the islands in adjacent bursts. Also, patterned media fabrication limits the smallest distance between two islands. Thus, it is convenient to use an integer multiple of Ii for the boundary interval. In this example, m=8, k3=8, and Ib=2*Ii. This means that the adjacent fields are equally angularly spaced apart by an integer multiple of the angular spacing of the radial stripes in each field.

Figure 13:
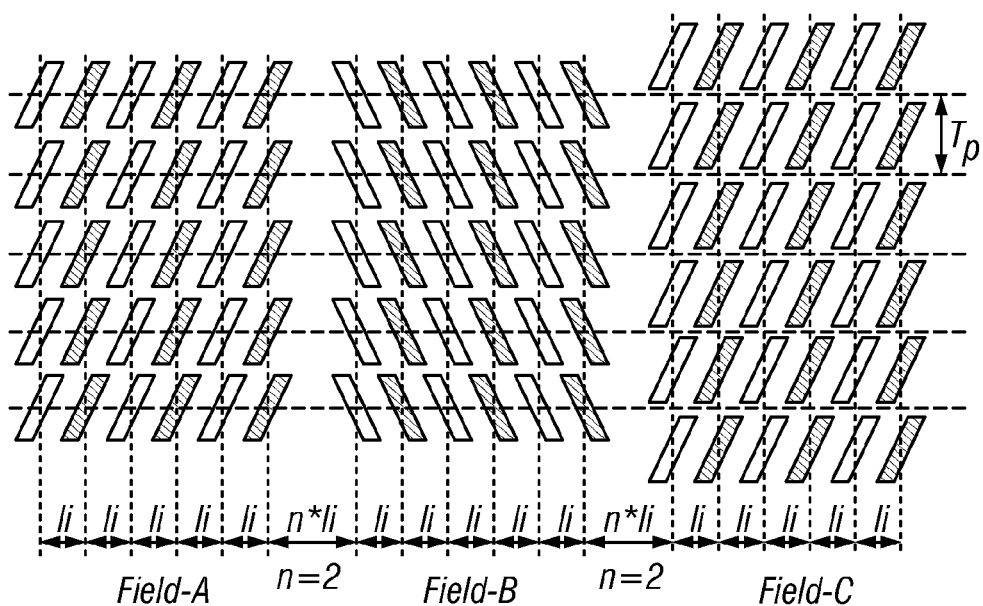
FIG. 13 is an illustration of three fields A, B and C for an example where the island radial height is approximately the same as the track pitch and the interval of the centers of the islands in the radial direction is Tp.
Figure 14:
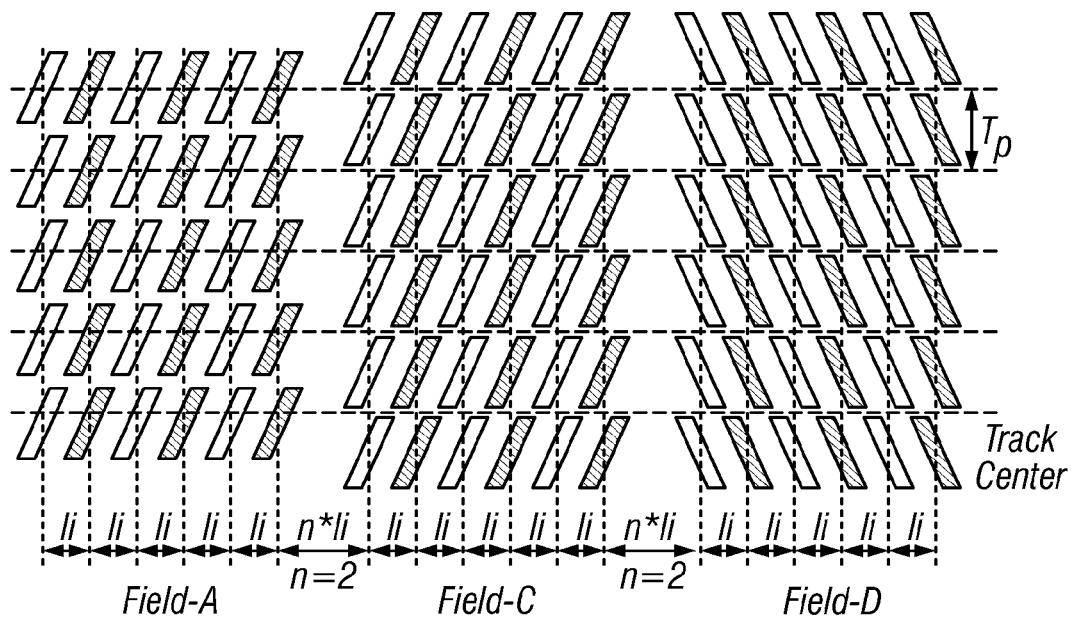
FIG. 14 is an illustration of three fields A, C and D for an example where the island radial height is approximately the same as the track pitch and the interval of the centers of the islands in the radial direction is Tp.
Figure 15:
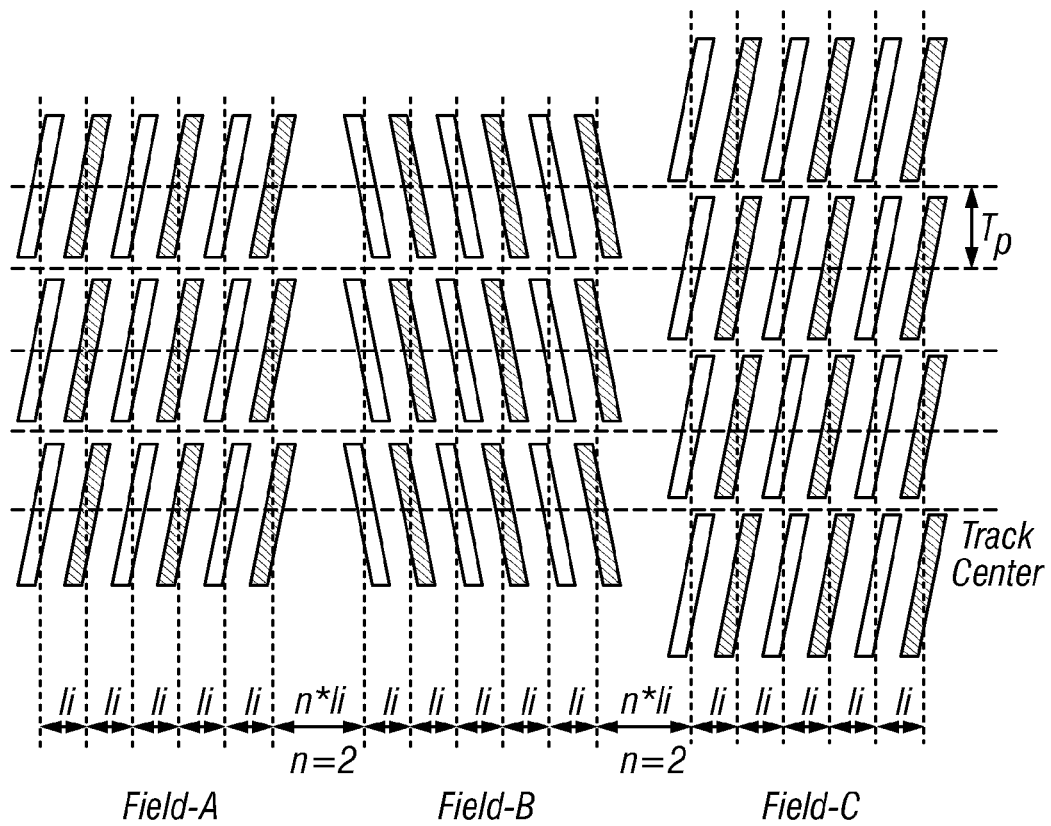
FIG. 15 is an illustration of three fields A, B and C for an example where the island radial height is approximately twice the track pitch and the interval of the centers of the islands in the radial direction is twice Tp.
Figure 16:
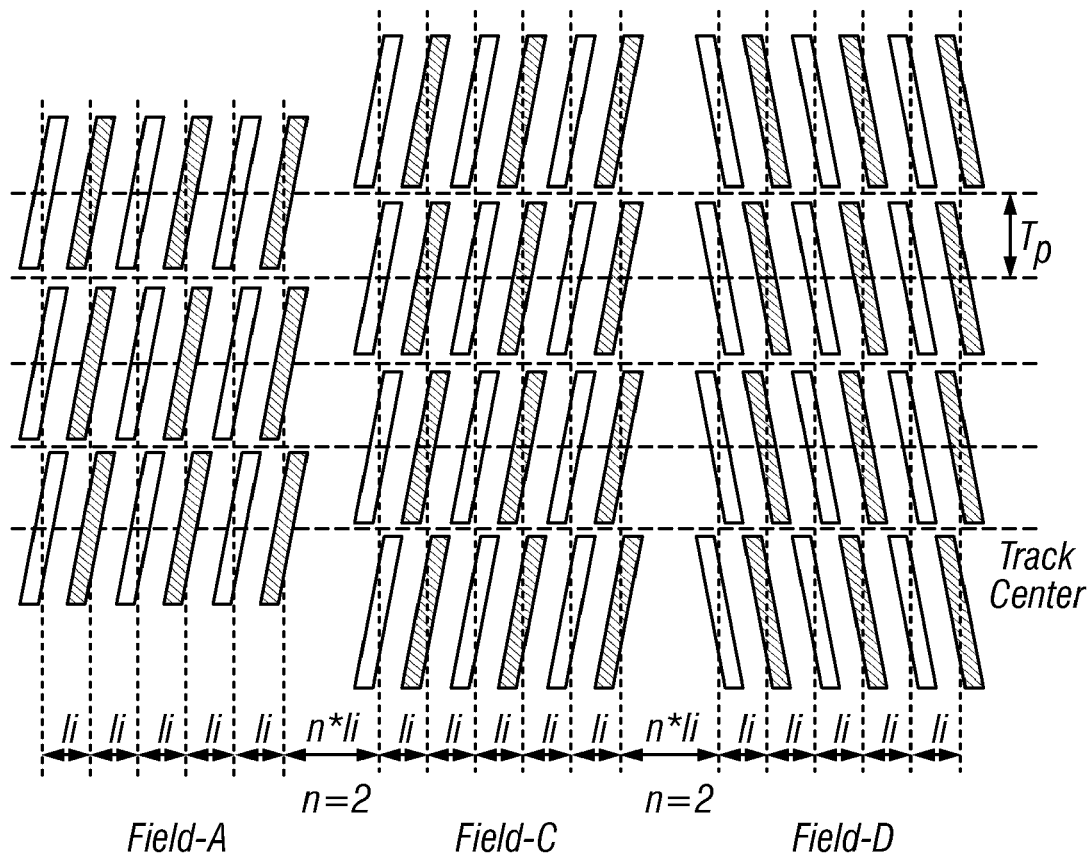
FIG. 16 is an illustration of three fields A, C and D for an example where the island radial height is approximately twice the track pitch and the interval of the centers of the islands in the radial direction is twice Tp.

FIG. 13 is an example where the island radial height is the same as the track pitch Tp, the radial spacing of the centers of the islands is Tp, and the combination of the fields is A+B+C. FIG. 14 is an example where the island radial height is same as the track pitch Tp, the radial spacing of the centers of the islands is Tp, and the combination of the fields is A+C+D. FIG. 15 is an example where the island radial height is the same as the twice Tp, the radial spacing of the centers of the islands is twice Tp, and the combination of the burst fields is A+B+C. FIG. 16 is an example where the island radial height is the same as twice Tp, the radial spacing of the centers of the islands is twice Tp, and the combination of the burst fields is A+C +D.

The demodulation method includes the phase measurement for each of the three fields and the mPES/sPES calculation. The phase measurement is the same as explained above, but one burst is eliminated. The mPES/sPES calculation requires a modification because of the data sampling start timing.

Figure 17:
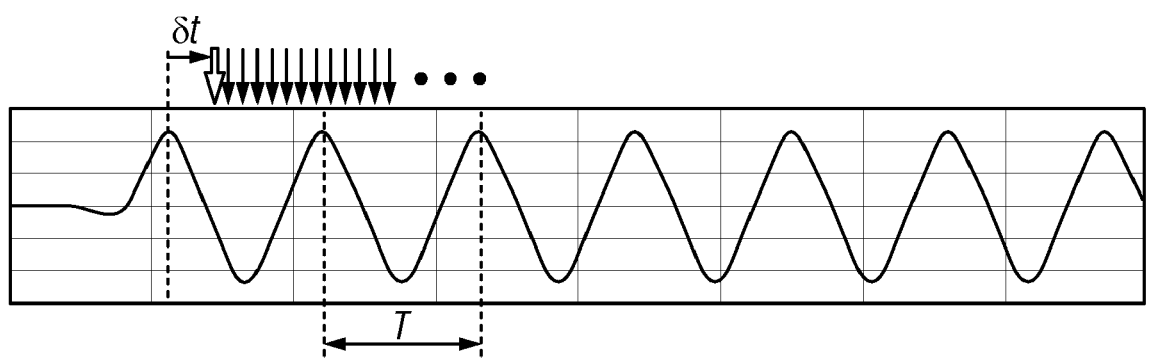
FIG. 17 is an illustration of the servo readback signal showing the data sampling start timing.

FIG. 17 shows the data sampling start timing. The downward pointing arrows represent the times of data sampling. The data sampling rate is constant and accurately controlled. The first large arrow is the start of data sampling, and "δt" is the time delay from the moment of the readback signal's upper peak to the start of data sampling. The phase measurement result by DFT for one burst depends on the data sampling start timing. Equation (19) shows the relationship between data sampling start delay and the phase measurement result for one burst on the assumption that the signal waveform is sinusoidal.

$$OFT = 360 * \delta t / T \qquad \text{Equation (19)}$$

OFT is the phase measurement result when the read head is at the track centerline. The phase pattern has two fields, and each field's slope is symmetric to a line perpendicular to the track centerline. This feature allows cancellation of the data sampling start timing error. Equations (20)-(23) show the theoretical expression of the phase measurement, where "rt" is the read head track position relative to the track centerline, "I_height" is the stripe island height in the radial direction, and OFT is the phase measurement result when "rt"=0. The term "ph(rt)" is the theoretical phase from the pattern at "rt" and is equal to "Xa*rt/Tp".

$$ph\_A(rt) = ph(rt) + OFT \qquad \text{Equation (20)}$$

$$ph\_B(rt) = -ph(rt) + OFT \qquad \text{Equation (21)}$$

$$ph\_C(rt) = ph(rt - I\_height/2) + OFT \qquad \text{Equation (22)}$$

$$ph\_D(rt) = -ph(rt - I\_height/2) + OFT \qquad \text{Equation (23)}$$

In the demodulation method using all four fields for the calculation of mPES/sPES, OFT is canceled out, as shown by Equations (1) and (2). In Equations (20)-(23), the OFT value is expressed as the same value. To achieve this, the stripe island circumferential interval "Ii" and island interval at the burst pattern field's boundary "Ib" must satisfy Equation (18) and the sampling rate must be constant. For the demodulation methods using only three fields, the sum of the phase measurement of two fields becomes simply twice the OFT. Equation (24) is the sum of Equations (20) and (21) and Equation (25) is the sum of Equations (22) and (23). Thus it is not necessary to have both field pairs A/B and C/D to cancel out OFT.

$$ph\_A(rt) + ph\_B(rt) = 2 * OFT \qquad \text{Equation (24)}$$

$$ph\_C(rt) + ph\_D(rt) = 2 * OFT \qquad \text{Equation (25)}$$

The mPES/sPES calculation method using this feature is expressed in equations (26) and (27) for the 3-burst pattern fields of A+B+C. In this case, Equation (26), the "mPES" calculation, is the same as for the four-field calculation. However, Equation (27), the "sPES" calculation, uses Equation (24) to cancel out the OFT.

$$\begin{aligned} mPES &= gain\_h * (ph\_A - ph\_B) / (2 * Xa) \\ &= gain\_h * ph(rt) / (Xa) \\ &= gain\_h * (rt / Tp) \end{aligned} \qquad \text{Equation (26)}$$

$$\begin{aligned} sPES &= gain\_h * [ph\_C - (ph\_A - ph\_B)/2] / Xa \\ &= gain\_h * [ph(rt - I\_height/2)] / Xa \\ &= gain\_h * (rt - I\_height/2) / Tp \end{aligned} \qquad \text{Equation (27)}$$

Similar results can be obtained for any other combination of three of the four fields A, B, C and D.

Demodulation Method Using Two Fields and Synchronization Marks

In another implementation of the invention the PES stripes and islands are as explained above, but the PES field has only two of the four Fields A, B, C and D, and the demodulation method uses the phase measurement from the synchronization field (like item 163 in FIG. 3). The elimination of two of the fields reduces the amount of disk space needed for servo information, thus increasing the amount of disk space available for data. This burst pattern portion can have any combination of two bursts, where one burst is A or B and the other burst is C or D.

Each of the stripes is placed at the circumferential interval Ii. The stripe interval at the boundary of the each field (Ib) is defined as n*Ii, and in the example explained below n=2. The rule of this interval is described by Equation (18), which is repeated here:

$$Ib = Ii*k3*(m/2) \text{ (nm)} \qquad \text{Equation (18)}$$

The term "Ib" depends on "m", the number of data samples per readback signal, and assumes alternating polarity of the magnetized stripes. The term "Ii" is proportional to the pattern's radial distance "r" from the center of the disk so that the servo pattern readback signal frequency is same across the entire disk. Thus in this two-burst pattern, like the previously described three-burst pattern, Ib is also proportional to the pattern's radial distance "r" from the center of the disk. As mentioned above for the three-burst implementation, it is convenient to use an integer multiple of Ii for the boundary interval. In this example, m=8, k3=8, and Ib=2*Ii.

Figure 18:
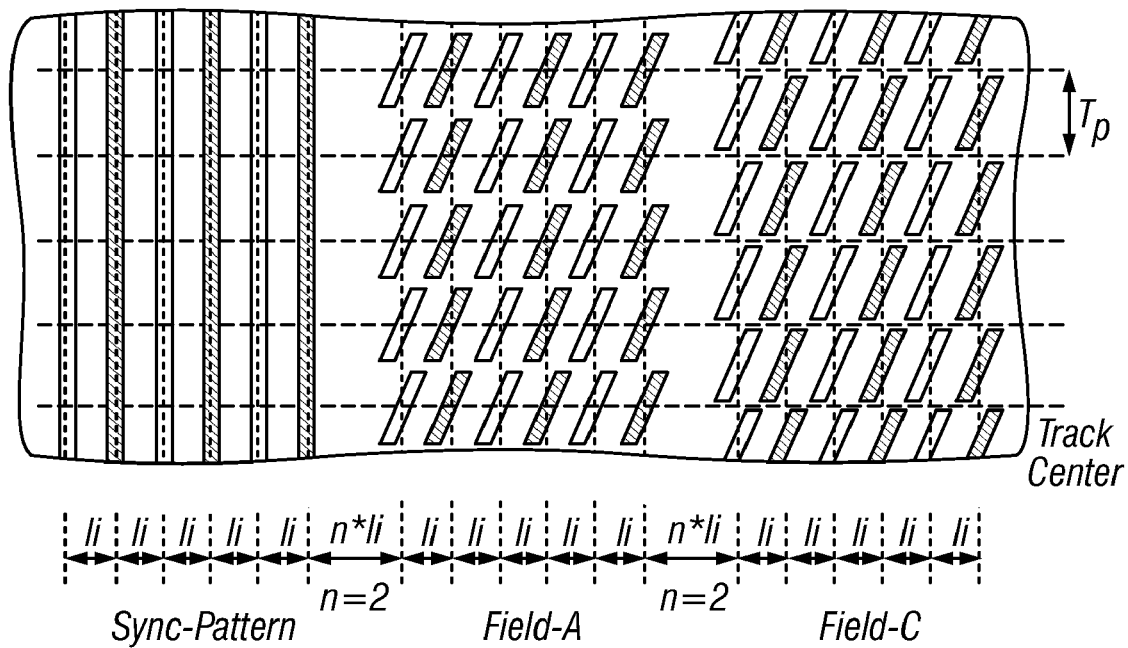
FIG. 18 is an example burst pattern where the island radial height is approximately the same as the track pitch Tp, the combination of the fields is A and C, the interval of the centers of the islands in the radial direction is Tp, and a synchronization pattern is used together with fields A and C.
Figure 19:
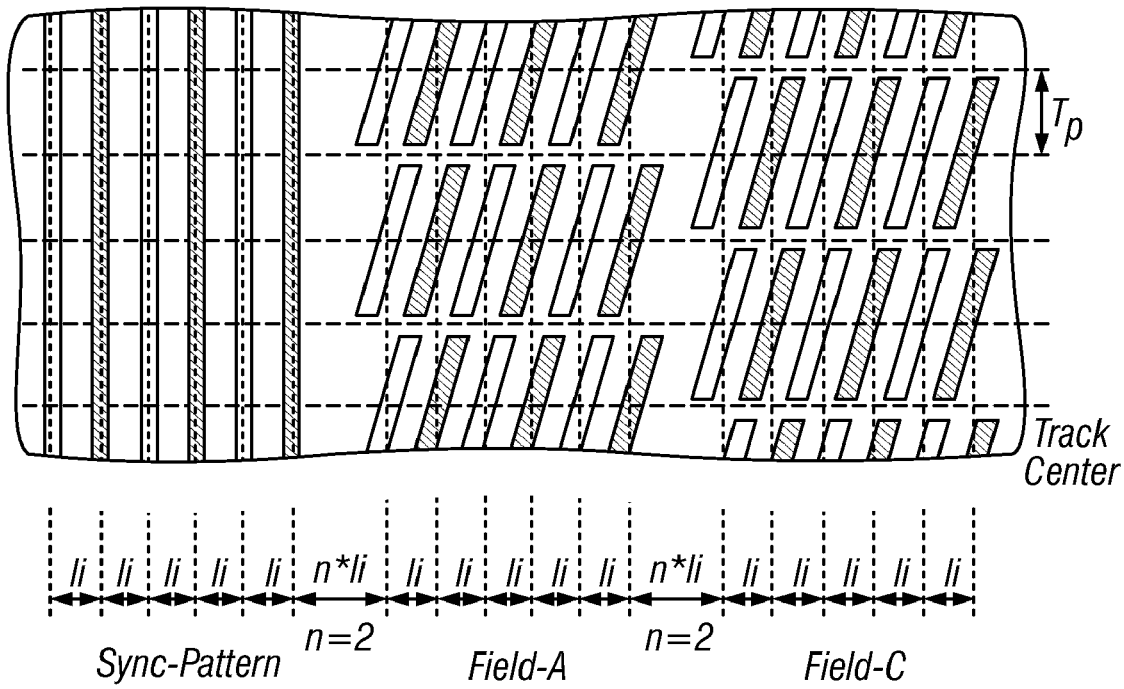
FIG. 19 is an example burst pattern where the island radial height is approximately twice Tp, the combination of the fields is A and C, the interval of the centers of the islands in the radial direction is twice Tp, and a synchronization pattern is used together with fields A and C.

FIG. 18 is an example burst pattern where the island radial height is the same as the track pitch Tp, the radial spacing of the centers of the islands is Tp, and the combination of the fields is A+C. FIG. 19 is an example burst pattern where the island radial height is the same as twice the track pitch Tp, the radial spacing of the centers of the islands is twice Tp, and the combination of the fields is A+C. In both FIGS. 18 and 19, the sync pattern with six radial sync marks or stripes is shown before the beginning of the PES field. The marks in the sync pattern, like the radial stripes in the PES fields, extend in the generally radial direction across the disk and preferably have an arcuate shape that generally replicates the path of the head as it is moved across the disk by the radial actuator (as shown by servo sectors 120 in FIG. 1A). The STM field and TID fields (items 302 and 304, respectively, in FIG. 3) are omitted.

As FIGS. 18 and 19 illustrate, the island interval of the sync marks or radial stripes must be the same as the islands in the PES fields. Thus in this demodulation method "Ii" is the circumferential interval between stripe islands in fields A and C and between the sync marks. Also, "Ii" must be designed to be proportional to the servo pattern radial distance "r" from the center of the disk. Then the servo pattern read-back signal frequency is same across the entire disk (or zone, as explained above, if there are multiple data zones). Also, the circumferential distance between the last sync mark and the first PES island is Ib and should be a multiple of the circumference interval Ii. In FIGS. 18 and 19, Ib=2*Ii. The term "synchronization pattern" is used for convenience herein and is not meant to imply that the radial "synchronization marks" are the same ones used for synchronizing the head for reading and writing of data (like item 163 in FIG. 3). Any pattern with the required spacing Ib between the PES fields and with radial marks with the required spacing Ii will function with this demodulation method that uses only two of the four fields.

As explained above, the demodulation method using the four fields A, B, C and D cancels out the phase measurement offset "OFT" due to the sampling start timing error. In this two-burst plus sync pattern method, the sync pattern phase information is used to cancel out OFT. The sync marks have the same circumference interval "Ii" as the islands in the two fields, and the circumferential interval between the sync pattern and the first burst (Field A in FIGS. 18 and 19) is a multiple of Ii. The synchronization pattern is composed entirely of islands that are radial stripes. Theoretically, the phase of the sync pattern is constant and only depends on the sampling start timing. Thus, if the sampling start timing is the same as the burst pattern phase measurement, the sync pattern's phase value is expressed as follows:

$$ph\_Sync(rt) = OFT \qquad \text{Equation (28)}$$

where ph_Sync(rt) is the sync pattern phase value and "rt" is the read head radial offset from the track centerline.

The following are the equations for mPES and sPES:

$$mPES = gain\_h*(ph\_A(rt) - ph\_Sync(rt))/Xa \qquad \text{Equation (29)}$$

$$mPES = gain\_h*(ph\_C(rt) - ph\_Sync(rt))/Xa \qquad \text{Equation (30)}$$

Thus, by subtracting the sync pattern phase value from the burst pattern phase value, the phase measurement offset is canceled out. Equations (29) and (30) show the calculation for the method that uses fields A and C. Similar equations apply for any other combination of two burst patterns with the sync pattern.

Figure 20:
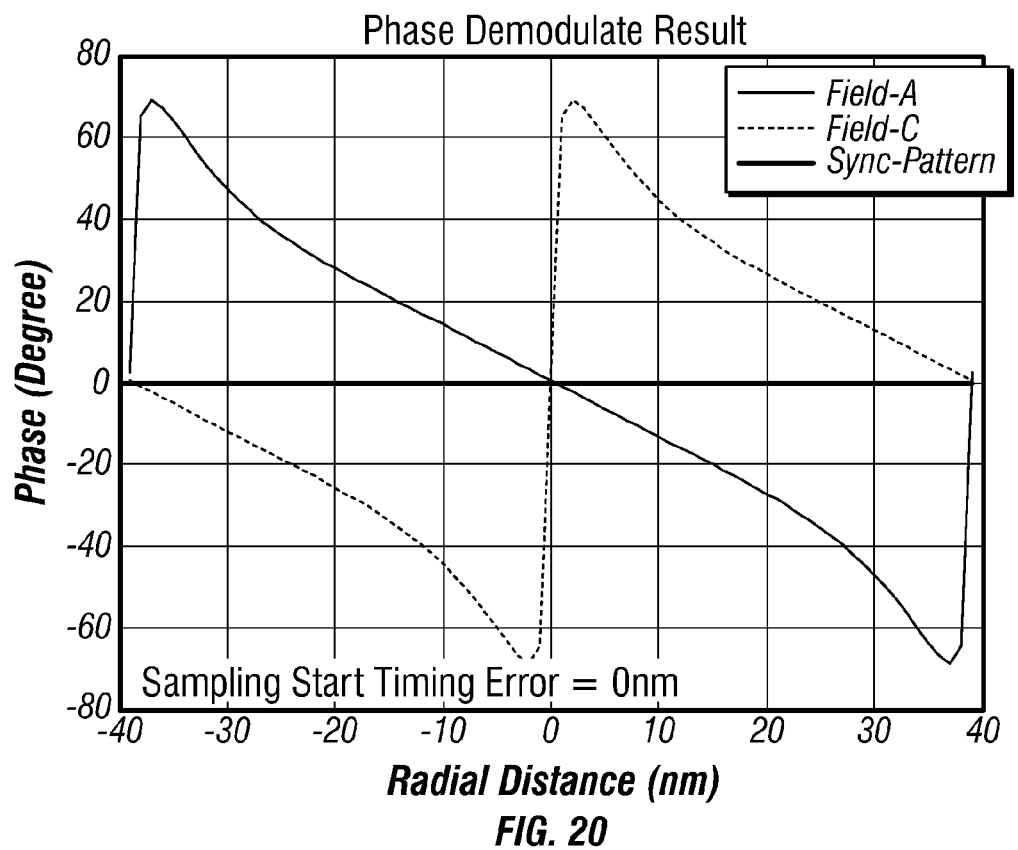
FIG. 20 is a graph of calculated main PES (mPES) and substitute PES (sPES) as a function of radial distance from the track centerline using the sync pattern and fields A and C, where the sampling start timing error is 0 nm.
Figure 21:
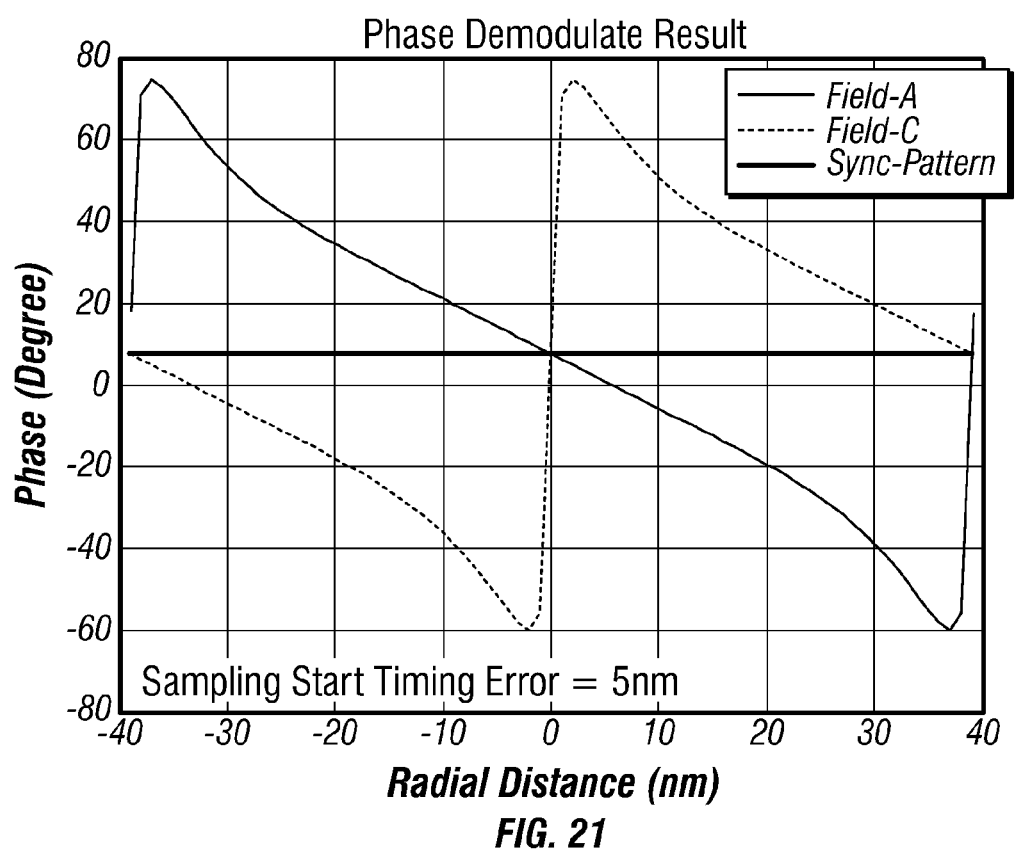
FIG. 21 is a graph of calculated main PES (mPES) and substitute PES (sPES) as a function of radial distance from the track centerline using the sync pattern and fields A and C, where the sampling start timing error is 5 nm.
Figure 22:
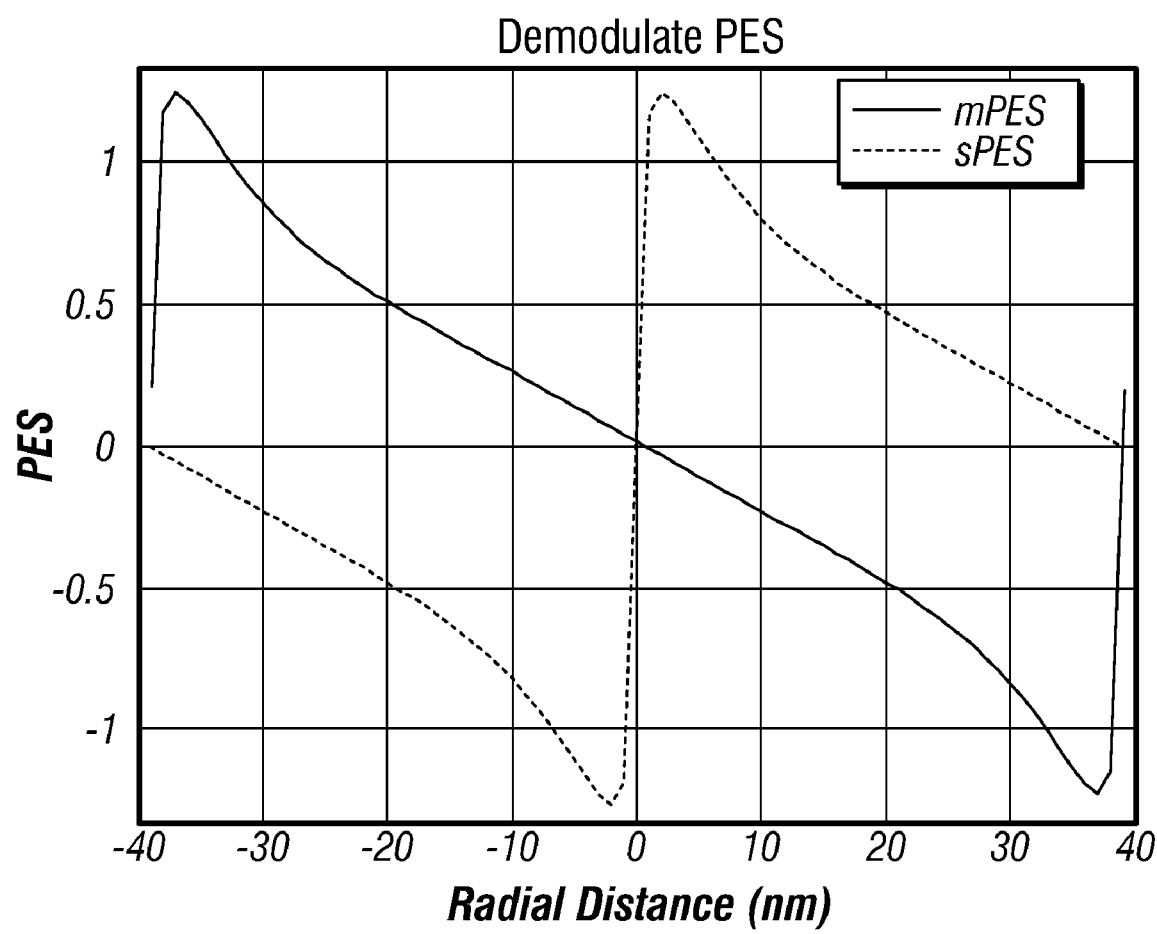
FIG. 22 is a graph of normalized PES as a function of radial distance from the track centerline using the sync pattern and fields A and C.

FIG. 20 shows an example of the phase measurement at the sync pattern, Field-A and Field-C, for an example where the islands in each field are centered at alternate track centerlines, like that shown in FIG. 19. In this example, Tp=39 nm, Xa=45 deg, Ii=130 nm, Ib=260 nm, gap=0.1*Ii, and island height h=1.4*Tp. In this, the sampling start timing error is 0 nm. Thus the sampling starts exactly at the maximum critical point of the readback signal. FIG. 21 shows the phase measurement result for the same conditions as FIG. 20, except the sampling start timing error is 5 nm. The phase measurement result shows the phase measurement offset "OFT" due to the sampling start timing error. A 5 nm start timing error in this example corresponds approximately to 6.9 degrees. However, the sync pattern phase also shows same amount of the offset, so the offset is canceled out. FIG. 22 is graph of calculated main PES (mPES) and substitute PES (sPES) as a function of radial distance from the track centerline for the example of FIG. 21.

For the final PES calculation, one or the other of the calculated mPES and sPES values in FIG. 21 is selected, depending on the read head radial location. The PES is calculated in the manner as described above for FIG. 11.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
   a recording layer of magnetizable material for the recording of data in a plurality of generally concentric circular data tracks, each track having a track centerline; and
   a plurality of nondata servo sectors extending generally radially across a plurality of the data tracks, the servo sectors comprising at least two fields of generally radially directed magnetized stripes separated by nonmagnetic spaces, each stripe comprising a plurality of discrete radially-spaced generally parallelogram-shaped islands, each island having its length oriented at an acute angle relative to a track centerline, wherein the islands in one of said at least two fields are shifted radially relative to the islands in another of said at least two fields and wherein a plurality of alternate stripes in each field in the along-the-track direction have a magnetization in a first direction and the stripes between said alternate stripes in each field have a magnetization in a second direction substantially antiparallel to said first direction.

2. The disk of claim 1 wherein the radial stripes in each field are generally equally angularly spaced.

3. The disk of claim 2 wherein the at least two fields are angularly spaced apart by an integer multiple of the angular spacing of the radial stripes.

4. The disk of claim 1 wherein the radial spacing between adjacent tracks is the track pitch (Tp), wherein the radial height of all islands is greater than one-half Tp and less than Tp, and wherein all the islands have the same radial height.

5. The disk of claim 4 wherein the radial stripes in one of said at least two fields are shifted radially by one-half Tp from the radial stripes in another of said at least two fields.

6. The disk of claim 1 wherein the radial spacing between adjacent tracks is the track pitch (Tp), wherein the radial height of all islands is greater than Tp and less than 2Tp, and wherein all the islands have the same radial height.

7. The disk of claim 6 wherein the radial stripes in one of said at least two fields are shifted radially by Tp from the radial stripes in another of said at least two fields.

8. The disk of claim 1 wherein the pattern of radial stripes in one of said at least two fields is the mirror image about a radial line of the pattern of the radial stripes in another of said at least two fields.

9. The disk of claim 1 wherein there are four fields comprising a first pair of fields A and B wherein the pattern of the radial stripes in field A is the mirror image about a radial line of the pattern of the radial stripes in field B, and a second pair of fields C and D wherein the pattern of radial stripes in field C is the mirror image about a radial line of the pattern of the radial stripes in field D.

10. The disk of claim 1 wherein there are at least three fields and wherein the radial stripes in each field are generally equally angularly spaced and the at least three fields are angularly spaced apart by an integer multiple of the angular spacing of the radial stripes.

11. The disk of claim 1 further comprising a synchronization pattern of radial synchronization marks extending generally radially across a plurality of the data tracks wherein a plurality of alternate synchronization marks in the along-the-track direction have a magnetization in a first direction and the synchronization marks between said alternate synchronization marks have a magnetization in a second direction substantially antiparallel to said first direction, and wherein the radial stripes in each field and the radial synchronization marks in the synchronization pattern are generally equally angularly spaced and the at least two fields and the synchronization pattern are angularly spaced apart by an integer multiple of the angular spacing of the radial stripes.

12. The disk of claim 1 wherein said first and second directions are substantially parallel to the plane of the recording layer.

13. The disk of claim 1 wherein said first and second directions are substantially perpendicular to the plane of the recording layer.

14. The disk of claim 1 wherein the data tracks are patterned into discrete data islands of magnetizable material separated by nonmagnetic spaces.

15. The disk of claim 1 wherein the data tracks are continuous magnetizable material of the recording layer.

16. The disk of claim 1 wherein the data tracks are discrete data tracks of continuous magnetizable material of the recording layer separated by concentric nonmagnetic guard bands.

17. A patterned-media perpendicular magnetic recording disk comprising:
a substrate; and
a recording layer of magnetizable material on the substrate and patterned into
(a) a plurality of generally concentric circular data tracks, each data track having a track centerline containing discrete data islands of magnetizable material, and
(b) a plurality of nondata servo sectors extending generally radially across a plurality of the data tracks, the servo sectors comprising at least two position error signal (PES) fields of generally equally angularly spaced radially directed magnetized stripes, each stripe comprising a plurality of discrete radially-spaced generally parallelogram-shaped islands, each island having its length oriented at an acute angle relative to a track centerline, wherein a plurality of alternate stripes in each field in the along-the-track direction are magnetized in a first direction generally perpendicular to the recording layer and the stripes between said alternate stripes in each field are magnetized in a second direction substantially antiparallel to said first direction, wherein each of the islands in one of said at least two fields is centered generally on a track centerline, wherein the islands in one of said at least two fields are shifted radially relative to the islands in another of said at least two fields, and wherein the at least two fields are angularly spaced apart by an integer multiple of the angular spacing of the stripes.

18. The disk of claim 17 wherein the radial spacing between adjacent tracks is the track pitch (Tp), wherein the radial height of all islands is greater than one-half Tp and less than Tp, and wherein all the islands have the same radial height.

19. The disk of claim 17 wherein the radial spacing between adjacent tracks is the track pitch (Tp), wherein the radial height of all islands is greater than Tp and less than 2Tp, and wherein all the islands have the same radial height.

20. The disk of claim 17 wherein the pattern of radial stripes in one of said at least two fields is the mirror image about a radial line of the pattern of the radial stripes in another of said at least two fields.

21. The disk of claim 17 wherein there are four fields comprising a first pair of fields A and B wherein the pattern of the radial stripes in field A is the mirror image about a radial line of the pattern of the radial stripes in field B, and a second pair of fields C and D wherein the pattern of radial stripes in field C is the mirror image about a radial line of the pattern of the radial stripes in field D.

22. The disk of claim 17 further comprising a synchronization pattern of radial synchronization marks extending generally radially across a plurality of the data tracks wherein a plurality of alternate synchronization marks in the along-the-track direction are magnetized in said first direction and the synchronization marks between said alternate synchronization marks are magnetized in a second direction substantially antiparallel to said first direction, and wherein the radial synchronization marks in the synchronization pattern are generally equally angularly spaced and the synchronization pattern is angularly spaced apart by an integer multiple of the angular spacing of the radial stripes.

23. A magnetic recording disk drive comprising:
a rotatable magnetic recording disk as in claim 17;
a write head that writes data in the data islands of the data tracks;
a read head that reads data from the data islands in the data tracks and detects the magnetized stripes in the fields in the servo sectors, the read head generating a readback servo signal from the stripes as the disk rotates;
an actuator connected to the heads for positioning the heads to different data tracks and maintaining the heads on the tracks; and
servo electronics responsive to the servo signal for generating a control signal to the actuator, the servo electronics including a processor for calculating the phases of the readback signal from the stripes in said at least two fields and for calculating the control signal from said calculated phases.

24. The disk drive of claim 23 wherein
all the islands in the stripes in the PES fields on the disk have the same radial height, wherein each servo sector on the disk has four PES fields comprising a first pair of fields A and B wherein the pattern of the radial stripes in field A is the mirror image about a radial line of the pattern of the radial stripes in field B, and a second pair of fields C and D wherein the pattern of radial stripes in field C is the mirror image about a radial line of the pattern of the radial stripes in field D, and wherein the islands in fields A and B are centered generally on a track centerline and the islands in fields C and D are shifted radially from the islands in fields A and B; and
the processor calculates a main position error signal (mPES) from the calculated phases of fields A and B and a substitute position error signal (sPES) from the calculated phases of fields C and D.

25. The disk drive of claim 23 wherein
the recording layer of magnetizable material on the substrate is also patterned into a synchronization pattern of radial synchronization marks extending generally radially across a plurality of the data tracks, a plurality of alternate synchronization marks in the along-the-track direction having a magnetization in said first direction and the synchronization marks between said alternate synchronization marks having a magnetization in a second direction substantially antiparallel to said first direction, and wherein the radial synchronization marks in the synchronization pattern are generally equally angularly spaced; and
the processor calculates a main position error signal (mPES) from the calculated phases of the synchronization pattern and one of said at least two PES fields and a substitute position error signal (sPES) from the calculated phases of the synchronization pattern and another of said at least two PES fields.

\* \* \* \* \*